United States Patent
Bernhardt

(10) Patent No.: US 11,967,738 B2
(45) Date of Patent: Apr. 23, 2024

(54) FULL PERIMETER ELECTRODE CELL

(71) Applicant: The Boeing Company, Chicago, IL (US)

(72) Inventor: Roger D. Bernhardt, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 16/684,442

(22) Filed: Nov. 14, 2019

(65) Prior Publication Data

US 2021/0151730 A1    May 20, 2021

(51) Int. Cl.
| | |
|---|---|
| H01M 50/531 | (2021.01) |
| H01M 10/04 | (2006.01) |
| H01M 10/0585 | (2010.01) |
| H01M 50/533 | (2021.01) |
| H01M 50/54 | (2021.01) |
| H01M 50/547 | (2021.01) |
| H01M 50/557 | (2021.01) |
| H01M 50/105 | (2021.01) |

(52) U.S. Cl.
CPC ..... *H01M 50/531* (2021.01); *H01M 10/0436* (2013.01); *H01M 10/0585* (2013.01); *H01M 50/533* (2021.01); *H01M 50/54* (2021.01); *H01M 50/547* (2021.01); *H01M 50/557* (2021.01); *H01M 50/105* (2021.01); *H01M 2220/20* (2013.01); *Y02E 60/10* (2013.01); *Y02P 70/50* (2015.11)

(58) Field of Classification Search
None
See application file for complete search history.

(56) References Cited

U.S. PATENT DOCUMENTS

| | | | | |
|---|---|---|---|---|
| 5,871,861 | A * | 2/1999 | Hirokou | H01M 10/613 |
| | | | | 429/149 |
| 2011/0206956 | A1* | 8/2011 | Woods, Jr. | H01M 50/528 |
| | | | | 29/2 |
| 2013/0177788 | A1* | 7/2013 | Hasegawa | H01M 10/0413 |
| | | | | 429/62 |
| 2016/0072121 | A9* | 3/2016 | Dhar | H01M 10/0477 |
| | | | | 429/210 |
| 2016/0260950 | A1* | 9/2016 | Baek | H01M 50/296 |

* cited by examiner

*Primary Examiner* — Ula C Ruddock
*Assistant Examiner* — Mary Grace Byram
(74) *Attorney, Agent, or Firm* — Haynes and Boone, LLP

(57) ABSTRACT

Systems, methods, and apparatus for a full perimeter electrode cell are disclosed. In one or more embodiments, a battery comprises a plurality of battery cells. The battery further comprises a plurality of anode electrodes and a plurality of cathode electrodes, of each of the battery cells, arranged around a perimeter of the battery. In at least one embodiment, the anode electrodes and the cathode electrodes, of each of the battery cells, are arranged such that they are alternating around the perimeter of the battery. In some embodiments, there are an equal number of the anode electrodes and the cathode electrodes, for each of the battery cells.

23 Claims, 21 Drawing Sheets

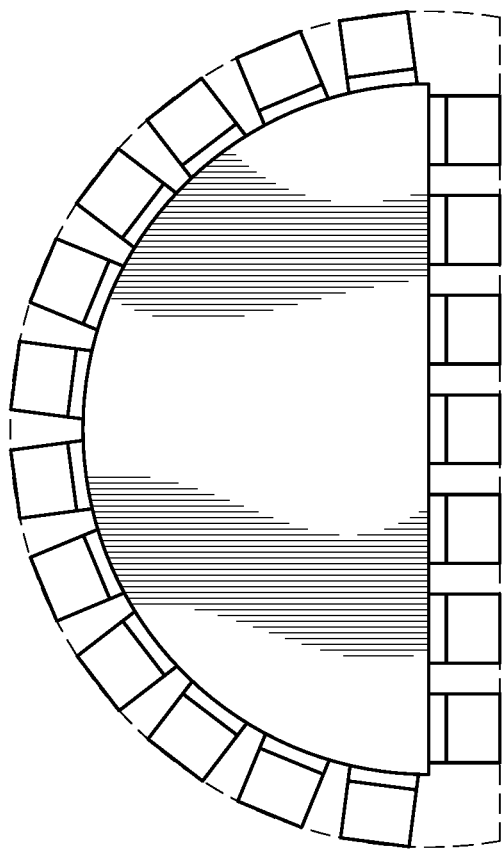

300

FULL PERIMETER ELECTRODE CELL

GOVERNMENT RIGHTS

This invention was made with Government support under (FA8650-18-C-2807) awarded by (Department of Defense). The Government has certain rights in this invention.

FIELD

The present disclosure relates to battery cells. In particular, the present disclosure relates to full perimeter electrode battery cells.

BACKGROUND

Currently, battery cells that are of a pouch or prismatic nature are typically created with two electrodes, which comprise a single anode and a single cathode. The two-electrode design limits the electrical and structural connections to the battery cell, and does not allow for the distribution of electrical and mechanical forces across the battery cell structure.

In addition, battery cells with only two electrodes have limited connection points that have to be aligned properly with corresponding connection points. The two-electrode design also limits the current capacity of the battery cell, and can cause hot spots within the battery cell during operation. The life of the battery cell can be impacted by charge distribution limitations and/or structurally induced mechanical deformations.

In light of the foregoing, there is a need for improved design for pouch or prismatic battery cells.

SUMMARY

The present disclosure relates to a method, system, and apparatus for full perimeter electrode battery cells. In one or more embodiments, a battery comprises a plurality of battery cells. The battery further comprises a plurality of anode electrodes and a plurality of cathode electrodes, of each of the battery cells, arranged around a perimeter of the battery.

In one or more embodiments, the anode electrodes and the cathode electrodes, of each of the battery cells, are arranged such that they are alternating around the perimeter of the battery. In at least one embodiment, there are an equal number of the anode electrodes and the cathode electrodes, for each of the battery cells.

In at least one embodiment, each of the battery cells comprises a plurality of layers. In one or more embodiments, the layers of each of the battery cells comprise an isolator layer, an anode layer, a separator layer, and a cathode layer. In some embodiments, the isolator layer is manufactured from an electrical insulator material. In at least one embodiment, the separator layer comprises an electrolyte material. In one or more embodiments, the anode layer and the cathode layer are both manufactured from an electrical conductor material.

In one or more embodiments, the battery is a pouch battery or a prismatic battery. In at least one embodiment, the anode electrodes of the battery are in electrical connection with cathode electrodes of another battery, and the cathode electrodes of the battery are in electrical connection with anode electrodes of the other battery.

In at least one embodiment, the battery is hermetically sealed. In some embodiments, each of the battery cells is hermetically sealed such that they are electrically isolated from one another.

In one or more embodiments, the battery further comprises a plurality of anode electrode collector tabs, where the anode electrode collector tabs collect the anode electrodes from the plurality of the battery cells. In some embodiments, the battery further comprises a plurality of cathode electrode collector tabs, where the cathode electrode collector tabs collect the cathode electrodes from the plurality of the battery cells.

In at least one embodiment, the battery is housed within a portion of a vehicle. In some embodiments, the battery forms a structural component of a vehicle. Examples of vehicles include, but are not limited to, aerospace vehicles such as airplanes (commercial and military), rotorcrafts, unmanned vehicles, space vehicles, submarines, and like aerospace vehicles.

In one or more embodiments, a method of operating a battery comprises applying a load, or a charge, across a plurality of battery cells of the battery. The method further comprises generating a current flowing from a plurality of anode electrodes to a plurality of cathode electrodes of each of the battery cells. In one or more embodiments, the anode electrodes and the cathode electrodes are arranged around a perimeter of the battery.

In at least one embodiment, a battery comprises a plurality of battery cells, each comprising an anode layer and a cathode layer. The battery further comprises a plurality of anode cross ties electrically connected to at least some of the anode layers of the battery. Further, the battery comprises a plurality of cathode cross ties electrically connected to at least some of the cathode layers of the battery.

In one or more embodiments, the anode cross ties and the cathode cross ties run through all of the battery cells of the battery. In at least one embodiment, the anode cross ties and the cathode cross ties are manufactured from an electrical conductor material. In some embodiments, the anode cross ties and the cathode cross ties each comprise conductive protrusions, which are located external to the battery.

In at least one embodiment, the conductive protrusions of the anode cross ties of the battery are in electrical connection with conductive protrusions of cathode cross ties of another battery. In some embodiments, the conductive protrusions of the cathode cross ties of the battery are in electrical connection with conductive protrusions of anode cross ties of another battery. In some embodiments, at least some of the conductive protrusions comprise a connecting portion.

In one or more embodiments, a method for operating a battery comprises applying a load, or a charge, across a plurality of battery cells of the battery. In one or more embodiments, each of the battery cells comprises an anode layer and a cathode layer. The method further comprises generating a current flowing through a plurality of anode cross ties electrically connected to at least some of the anode layers of the battery. Further, the method comprises generating a current flowing through a plurality of cathode cross ties electrically connected to at least some of the cathode layers of the battery.

In at least one embodiment, a battery comprises a plurality of battery cells. The battery further comprises a plurality of anode electrodes and a plurality of cathode electrodes, of each of the battery cells, arranged around a perimeter of the battery. Further, the battery comprises a controller to apply, for each of the battery cells, a load or a charge from the anode electrodes to the cathode electrodes in a pattern such that charge is uniformly distributed across each of the battery cells.

In one or more embodiments, the controller is located external or internal to the battery. In at least one embodiment, the battery further comprises a processor to determine the pattern for applying the load or the charge from the anode electrodes to the cathode electrodes for each of the battery cells.

In at least one embodiment, the controller comprises the processor. In some embodiments, the battery is housed within a portion of a vehicle.

In one or more embodiments, a method of operating a battery comprises applying, by a controller, for each of a plurality of battery cells of the battery, a load or a charge from anode electrodes to cathode electrodes in a pattern such that charge is uniformly distributed across each of the battery cells. In one or more embodiments, the anode electrodes and the cathode electrodes are arranged around a perimeter of the battery.

In at least one embodiment, the method further comprises determining, by a processor, the pattern for applying the load or the charge from the anode electrodes to the cathode electrodes for each of the battery cells.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1D is a diagram showing a full perimeter electrode battery, which comprises a semicircle shape, in accordance with at least one embodiment of the present disclosure.

DESCRIPTION

Figure 1A:
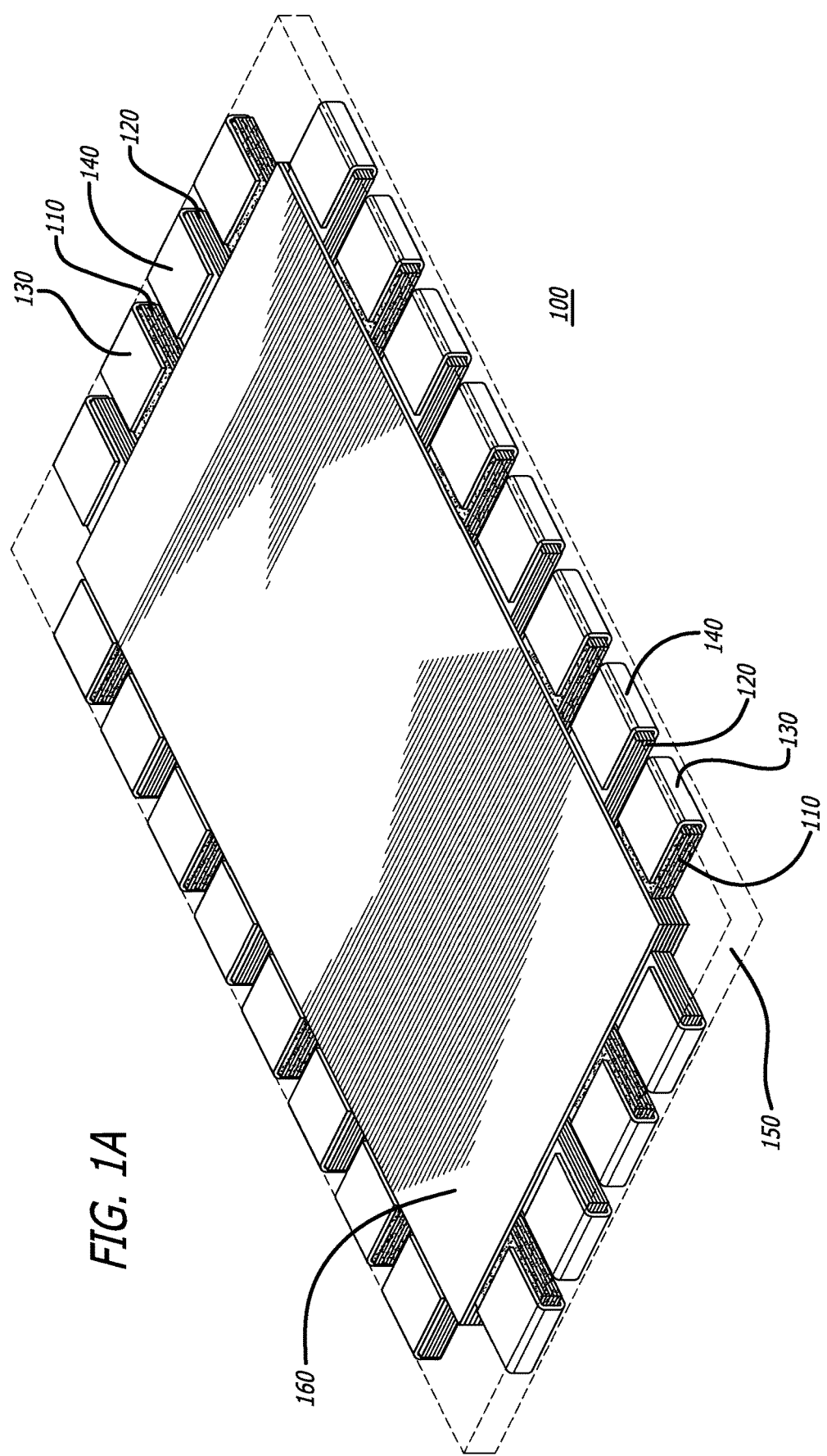
FIG. 1A is a diagram showing a full perimeter electrode battery, which comprises a rectangular shape, in accordance with at least one embodiment of the present disclosure.

The methods and apparatus disclosed herein provide operative systems for full perimeter electrode battery cells. In one or more embodiments, the system of the present disclosure provides a battery cell that is surrounded by alternating electrodes in any quantity desired to distribute the electrical and mechanical connections as well as spread the current and stress throughout the battery cell.

As previously mentioned above, battery cells that are of a pouch or prismatic nature are typically created with two electrodes, which comprise a single anode and a single cathode. The two-electrode design limits the electrical and structural connections to the battery cell, and does not allow for the distribution of electrical and mechanical forces across the battery cell structure.

In addition, battery cells with only two electrodes have limited connection points that have to be aligned properly with corresponding connection points. The two-electrode design also limits the current capacity of the battery cell, and can cause hot spots within the battery cell during operation. The life of the battery cell can be impacted by charge distribution limitations and/or structurally induced mechanical deformations.

Conversely, the battery cell of the present disclosure comprises multiple electrodes situated on its outer perimeter. The electrodes switch polarity as they are distributed around the perimeter of the battery cell. This distribution of electrodes allows for the battery cells to be stacked together or assembled next to each other, while having the electrodes easily aligned properly to their corresponding electrode connections. The plurality of electrodes spreads the current throughout the battery cell and distributes the stress across the battery cell structure. For example, the plurality of electrodes on the perimeter of the battery cell aids with stress loading across the battery cell structure, when the battery cell is being used as a structural member, such as in an aircraft.

Battery or energy cells that can be structurally integrated into a vehicle can reduce the weight of a vehicle, such as an aerospace vehicle. For example, weight can become a huge factor for creating lighter aircraft for the future development of electrical aircraft. How a battery cell is mounted into an aircraft structure becomes critical when the weight of the aircraft is an issue. Cross ties integrated within a battery cell can provide a conductive as well as structural connection for the entire battery into an aircraft structure. The integration of the battery cell within the aircraft structure can allow for a reduction in the overall weight of the aircraft.

In one or more embodiments, conductive cross ties are integrated within the disclosed battery cell. One or more cross ties in a battery cell, which span the entirety of the battery cell and that protrude or otherwise connect to a structure, can provide both electrical and structural interconnections to take both electrical and structural types of loads. These conductive protrusions can be captured in the surrounding structure and help control shear, tension, and compression loads as well as act as distributed electrical connections. Each conductive crosstie is isolated from one another to prevent shorts, and interconnects only with appropriate electrode layers within the battery cell. Thermal welding or mechanical connections may be used to seal and electrically connect the conductive cross ties to the electrode layers, isolator layers, as well as the external package housing. Incorporating cross ties within battery cells creates opportunities for stacking battery cells as well as for creating structural members where the crosstie can carry the loading. As such, a crosstie in a battery cell can be connected across multiple battery cells that are stacked together and can also be used as a structural connection for the entire battery cell into an aircraft structure.

Electrochemical batteries consist of materials that distribute and deliver charge in a geometric fashion. Significant charge related motion occurs, especially in wet chemistry cells, where electrolyte species and contaminants move as charge is delivered into, or removed from, the battery. These motion aspects are driven by the depletion of the electrochemical species, which also drives the formation of dendrites and mossy structures within the battery cell, which can interrupt battery cell function.

In one or more embodiments, selective switching of the externally distributed electrodes of the battery during the charging and discharging of the battery is employed. This selective switching allows for the motion of the electrolyte species and contaminants to be controlled and managed to assure maximum cell performance, which includes maximizing the amount of energy delivered by the battery while extending the life of the battery cell. In one or more embodiments, switched charging controls and logic-based use of the switching of the electrodes are employed to distribute the charge across the battery cell in a calculated manner to achieve and maximize performance goals. In one or more embodiments, during operation, the battery cell is charged selectively through a patterned use of the external electrodes by using intelligent switching techniques in order to move the electrochemical species uniformly within the battery cell, thereby allowing for a reduction in the degradation effects of the battery cell, which extends the life of the battery cell.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to battery cells, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

FIG. 1A is a diagram showing a full perimeter electrode battery 100, which comprises a rectangular shape, in accordance with at least one embodiment of the present disclosure. In this figure, the battery 100 is shown to be a pouch battery, or a prismatic battery. It should be noted that prismatic batteries generally resemble a box shape and, thus, are able to satisfy the demand for thinner sized batteries. Typically, prismatic batteries are packaged in welded aluminum housings. The prismatic battery cell design allows for an improvement in space utilization and allows for flexible designs. Pouch batteries are similar to prismatic batteries in that they generally resemble a box shape. However, pouch batteries comprise external conductive foil-tabs welded to the electrodes of the battery. And unlike prismatic batteries, pouch batteries do not employ a metal enclosure, which allows for a reduction in weight of the battery. As such, pouch batteries offer a simple, flexible, and lightweight solution for a battery design.

The battery 100 of FIG. 1A is also shown to comprise a plurality of electrodes (i.e. anode electrodes 110 and cathode electrodes 120), which are located external to the body 160 of the battery 100. In one or more embodiments, the body 160 of the battery 100 may be anisotropic. In this figure, the electrodes are arranged around a perimeter of the battery 100. However, it should be noted that in some embodiments, the electrodes may be arranged on the perimeter of the battery 100 in different configurations than as shown in FIG. 1A (e.g., the electrodes may be arranged on only two sides of the battery 100).

Also shown in FIG. 1A, the electrodes are arranged such that they are alternating around the perimeter of the battery 100 (i.e. the anode electrodes 110 are alternating with the cathode electrodes 120 around the perimeter of the battery 100). However, it should be noted that in other embodiments, the electrodes may be arranged such that they are not alternating around the perimeter of the battery 100 (e.g., one side of the battery 100 may have only anode electrodes 110, and an opposite side of the battery 100 may have only cathode electrodes 120).

In addition, in FIG. 1A, the battery 100 is shown to comprise an equal number of anode electrodes 110 and cathode electrodes 120. It should be noted that in other embodiments, the battery 100 may comprise an unequal number of anode electrodes 110 and cathode electrodes 120.

The battery 100 of FIG. 1A is also shown to comprise a plurality of anode electrode collector tabs 130 and cathode electrode collector tabs 140. Each of the anode electrode collector tabs 130 collects a plurality of the anode electrodes 110 as is shown in FIG. 1A, and each of the cathode electrode collector tabs 140 collects a plurality of cathode electrodes 120 as is shown in FIG. 1A. In one or more embodiments, the anode electrode collector tabs 130 and the cathode electrode collector tabs 140 may be manufactured from a rigid conductive material (e.g., a metal, such as copper or aluminum), which provides for sturdy connection ports for the battery 100.

In one or more embodiments, the battery 100 is hermetically sealed within a housing 150 (e.g., a pouch) such that the battery 100 is electrically isolated from other batteries and other electrical components. In some embodiments, the housing is manufactured from an electrical insulator material (e.g., a non-porous plastic, such as a polyethylene or a polypropylene).

During operation of the battery 100 of FIG. 1A, a load (for the discharging of the battery 100), or alternatively a charge (for the charging of the battery 100), is applied across battery 100 (e.g., is applied across the anode electrodes 110 and the cathode electrodes 120). Then, a current is generated that flows from the anode electrodes 110 to the cathode electrodes 120.

It should be noted that, conventionally, the terms "anode" and "cathode" are not defined by the voltage polarity of the electrodes, but rather by the direction of the current through the electrode. An "anode" is an electrode through which conventional current (i.e. positive charge) flows into the device from an external circuit, and a "cathode" is an electrode through which conventional current flows out of the device. However, if the current through the electrodes reverses direction, as occurs for example in a rechargeable battery when it is being charged, the naming of the electrodes as "anode" and "cathode" is reversed.

Figure 1B:
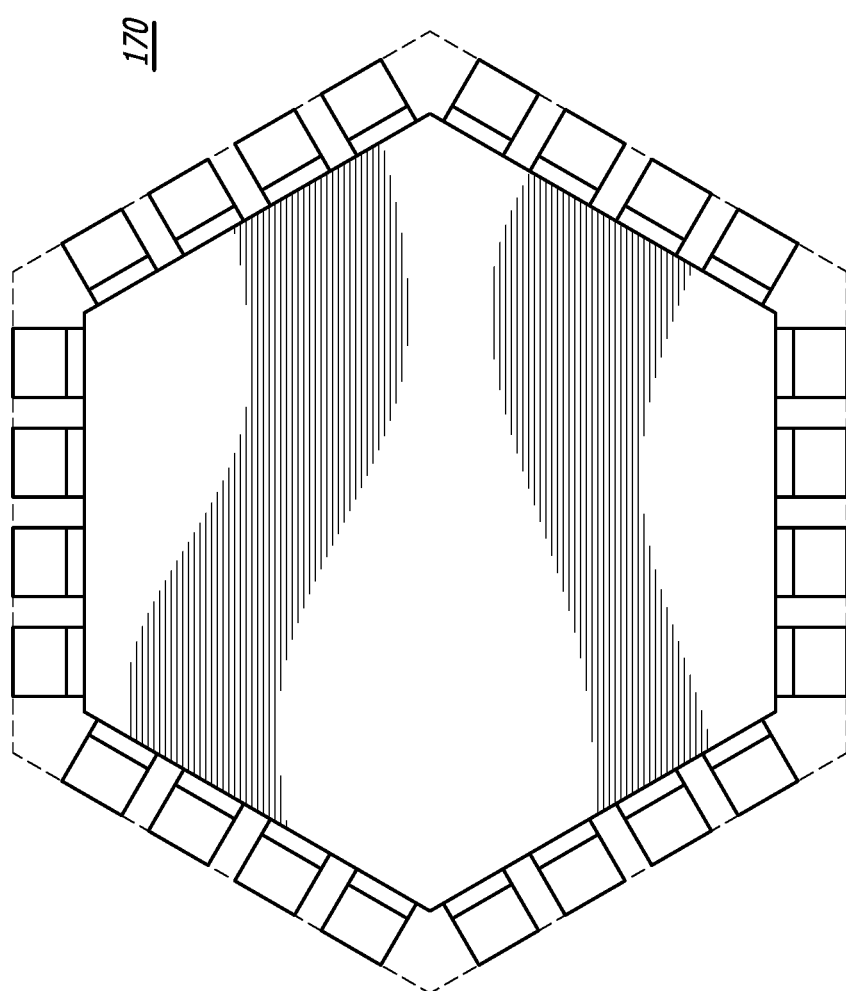
FIG. 1B is a diagram showing a full perimeter electrode battery, which comprises a polygon shape, in accordance with at least one embodiment of the present disclosure.
Figure 1C:
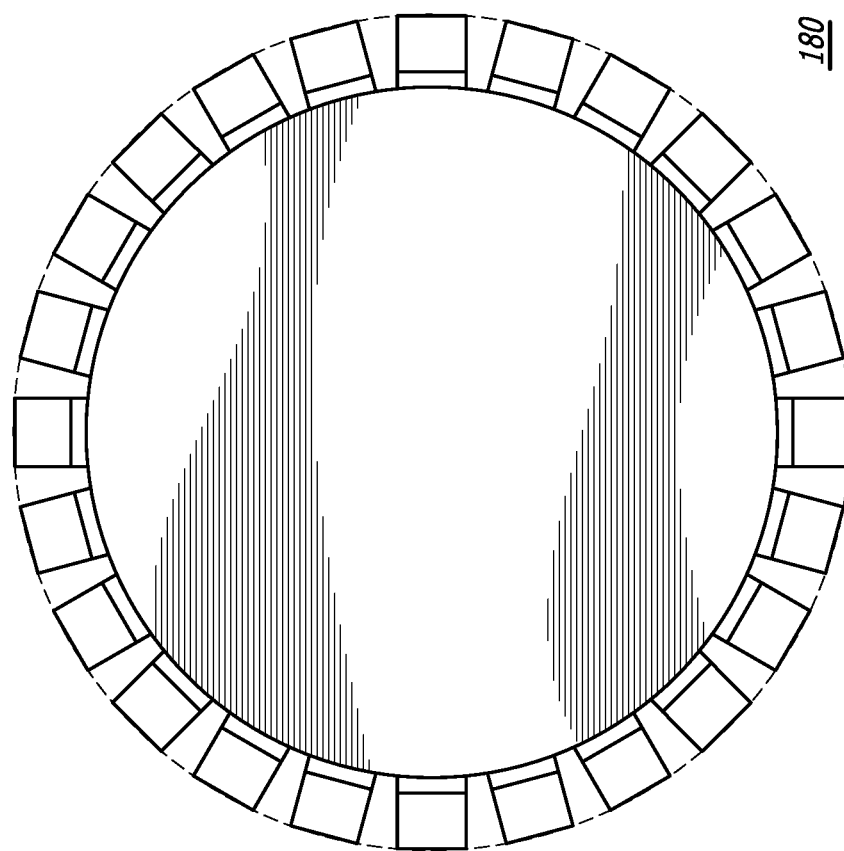
FIG. 1C is a diagram showing a full perimeter electrode battery, which comprises a circle shape, in accordance with at least one embodiment of the present disclosure.

In addition, it should be noted that although FIG. 1A shows the battery 100 comprising a rectangular shape, the battery 100 may be manufactured to be of other different shapes including, but not limited to, regular shapes (i.e. a shape having all sides of an equal size and having all inside angles of an equal size) and irregular shapes (i.e. a shape not having all sides of an equal size or not having all inside angles of an equal size). FIGS. 1B, 1C, and 1D show full perimeter electrode batteries comprising various different exemplary shapes. In particular, FIG. 1B is a diagram showing a full perimeter electrode battery 170 comprising a polygon shape, FIG. 1C is a diagram showing a full perimeter electrode battery 180 comprising a circle shape, and FIG. 1D is a diagram showing a full perimeter electrode battery 190 comprising a semicircle shape.

Figure 2:
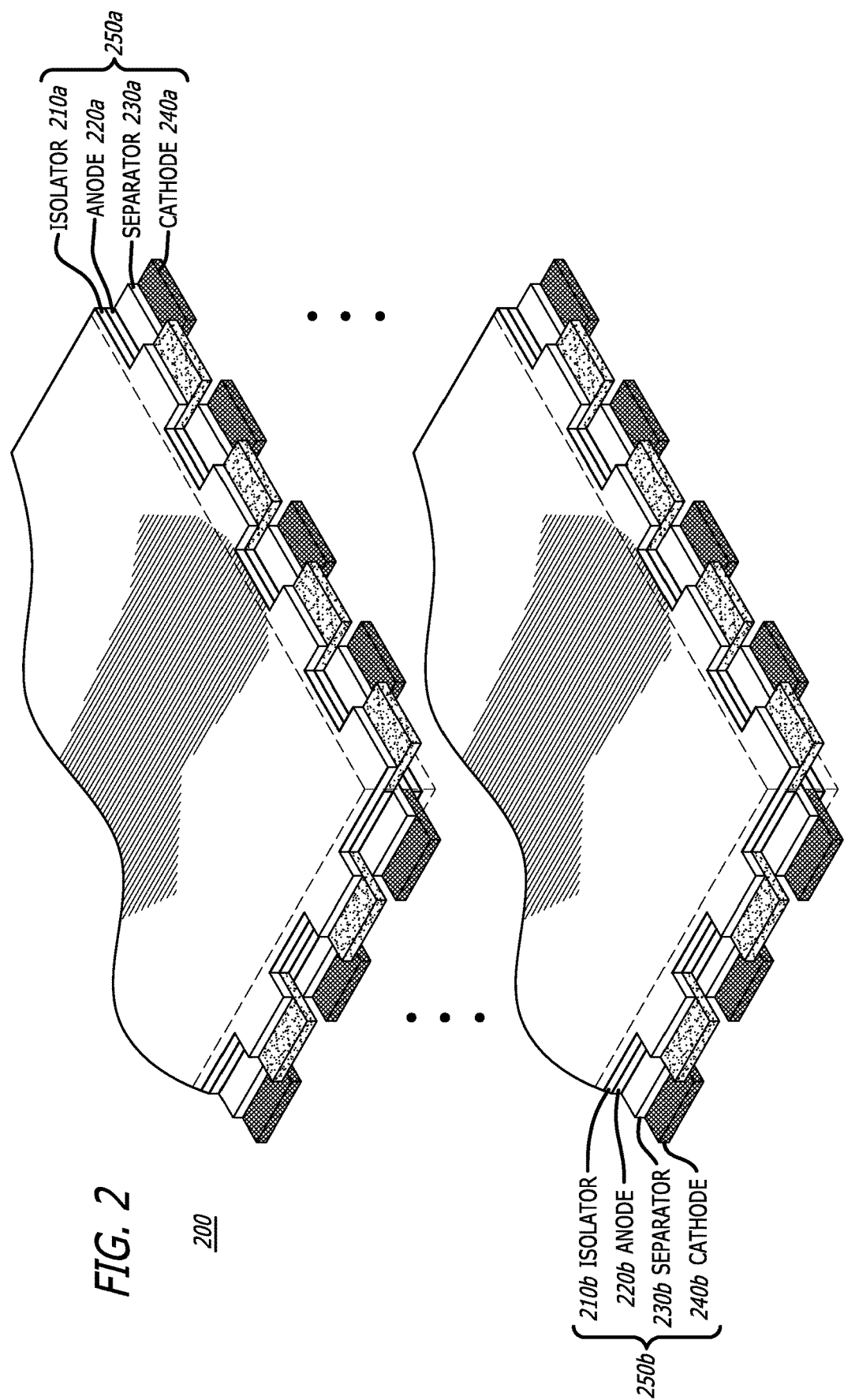
FIG. 2 is a diagram showing a detailed portion of a full perimeter electrode battery depicting the layers of the battery, in accordance with at least one embodiment of the present disclosure.

FIG. 2 is a diagram showing a detailed portion of a full perimeter electrode battery 200 depicting the layers of the battery 200, in accordance with at least one embodiment of the present disclosure. In this figure, the battery 200 is shown to comprise a plurality of layers. In particular, in this figure, two sets of layers of the battery 200 are shown. Each set of layers forms a battery cell 250a, 250b. For example, a first battery cell 250a comprises an isolator layer 210a, an anode layer 220a, a separator layer 230a, and a cathode layer 240a. And, a second battery cell 250b comprises an isolator layer 210b, an anode layer 220b, a separator layer 230b, and a cathode layer 240b.

As shown in this figure, anode electrodes (i.e. anode electrode tabs) are formed on the edges of the anode layers 220a, 220b of the battery cells 250a, 250b; and cathode electrodes (i.e. cathode electrode tabs) are formed on the edges of the cathode layers 240a, 240b of the battery cells 250a, 250b. In one or more embodiments, the anode electrodes and the cathode electrodes are arranged around a perimeter of each of the battery cells 250a, 250b. In some embodiments, the anode electrodes and the cathode electrodes are alternating around the perimeter of the battery cells 250a, 250b. In at least one embodiment, each of the battery cells 250a, 250b comprise an equal number of anode electrodes and cathode electrodes.

Figure 10:
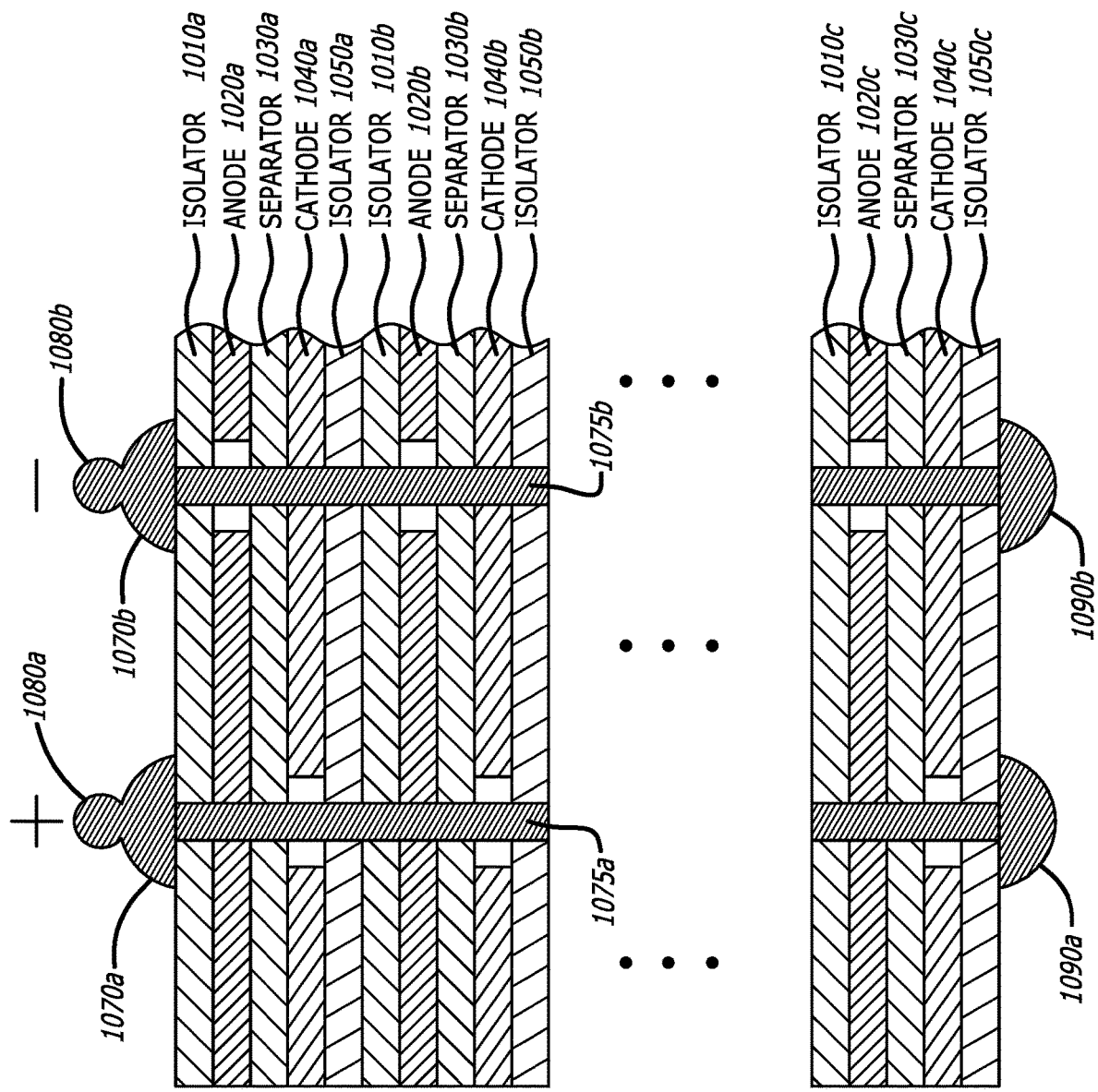
FIG. 10 is a diagram showing a cut-away view of a portion of a full perimeter electrode battery, which comprises an anode cross tie and a cathode cross tie, illustrating the layers of the battery, in accordance with at least one embodiment of the present disclosure.

It should be noted that in other embodiments, each battery cell 250a, 250b may comprise an additional isolator layer (i.e. a secondary isolator layer) that follows the cathode layer 240a, 240b (e.g., refer to the embodiment of FIG. 10 to view battery cells that comprise a secondary isolator layer, such as layers 1050a, 1050b, 1050c).

The layers of the battery cells 250a, 250b may be manufactured from various different types of materials. For example, in one or more embodiments, the anode layers 220a, 220b, and the cathode layers 240a, 240b of the battery 200 are manufactured from an electrical conductor material (e.g., a metal, such as aluminum or copper). In some embodiments, the isolator layers 210a, 210b of the battery 200 are manufactured from an electrical insulator material (e.g., a non-porous plastic, such as a polyethylene or a polypropylene). In at least one embodiment, the separator layers 230a, 230b of the battery 200 are manufactured from a porous insulator material (e.g., a porous plastic, such as a porous polyethylene or a porous polypropylene). The separator layers 230a, 230b comprise an electrolyte material (e.g., a solvent comprising salt) to allow for the electrochemical reaction within the battery cell 250a, 250b.

Figure 3:
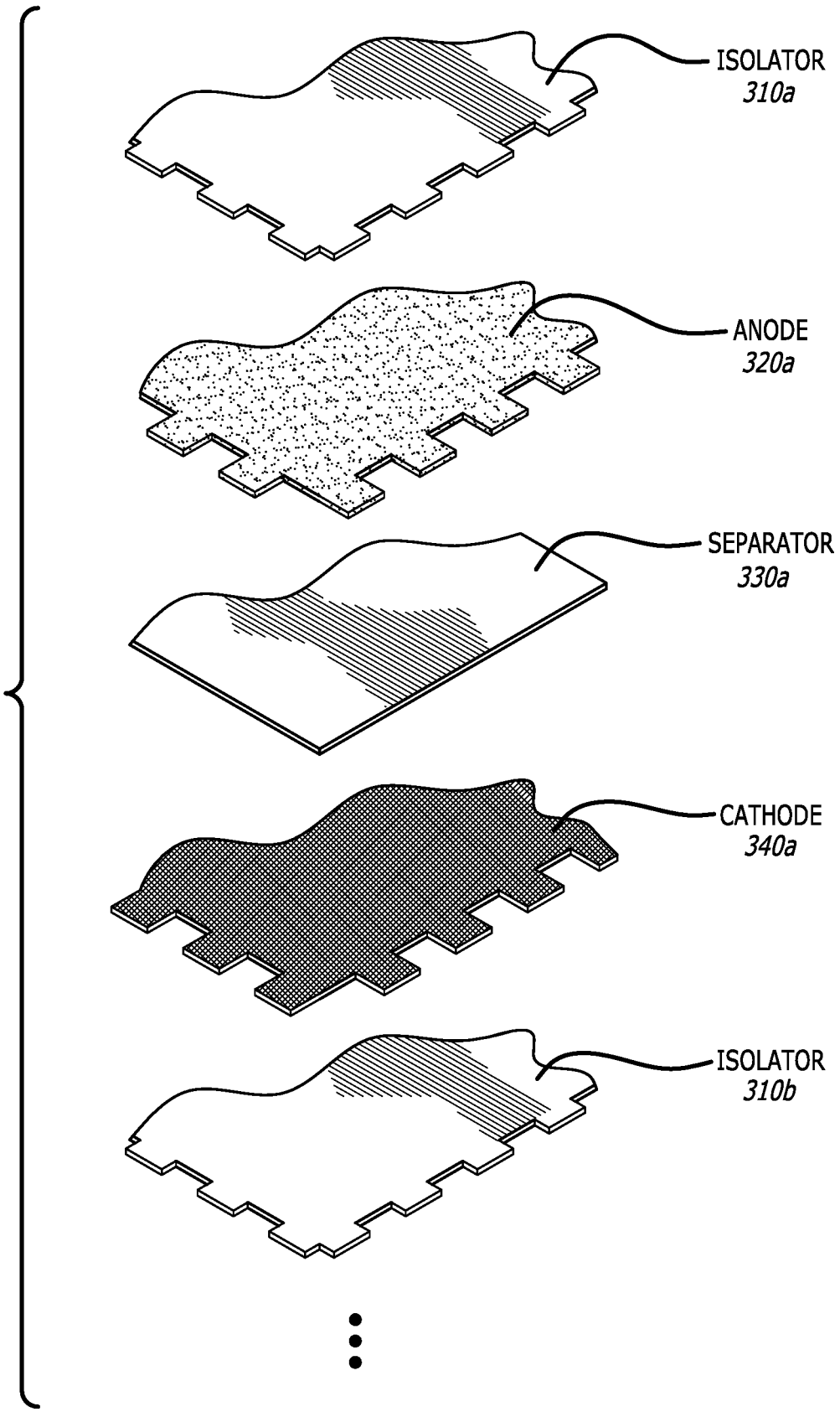
FIG. 3 is a diagram showing an exploded view of a portion of a full perimeter electrode battery illustrating the layers of the battery, in accordance with at least one embodiment of the present disclosure.

FIG. 3 is a diagram showing an exploded view of a portion 300 of a full perimeter electrode battery illustrating the layers of the battery, in accordance with at least one embodiment of the present disclosure. In particular, FIG. 3 shows the exploded view of some of the layers of a full perimeter electrode battery. In FIG. 3, the layers shown comprise an isolator layer 310a, an anode layer 320a, a separator layer 330a, a cathode layer 340a, and another isolator layer 310b.

Figure 4:
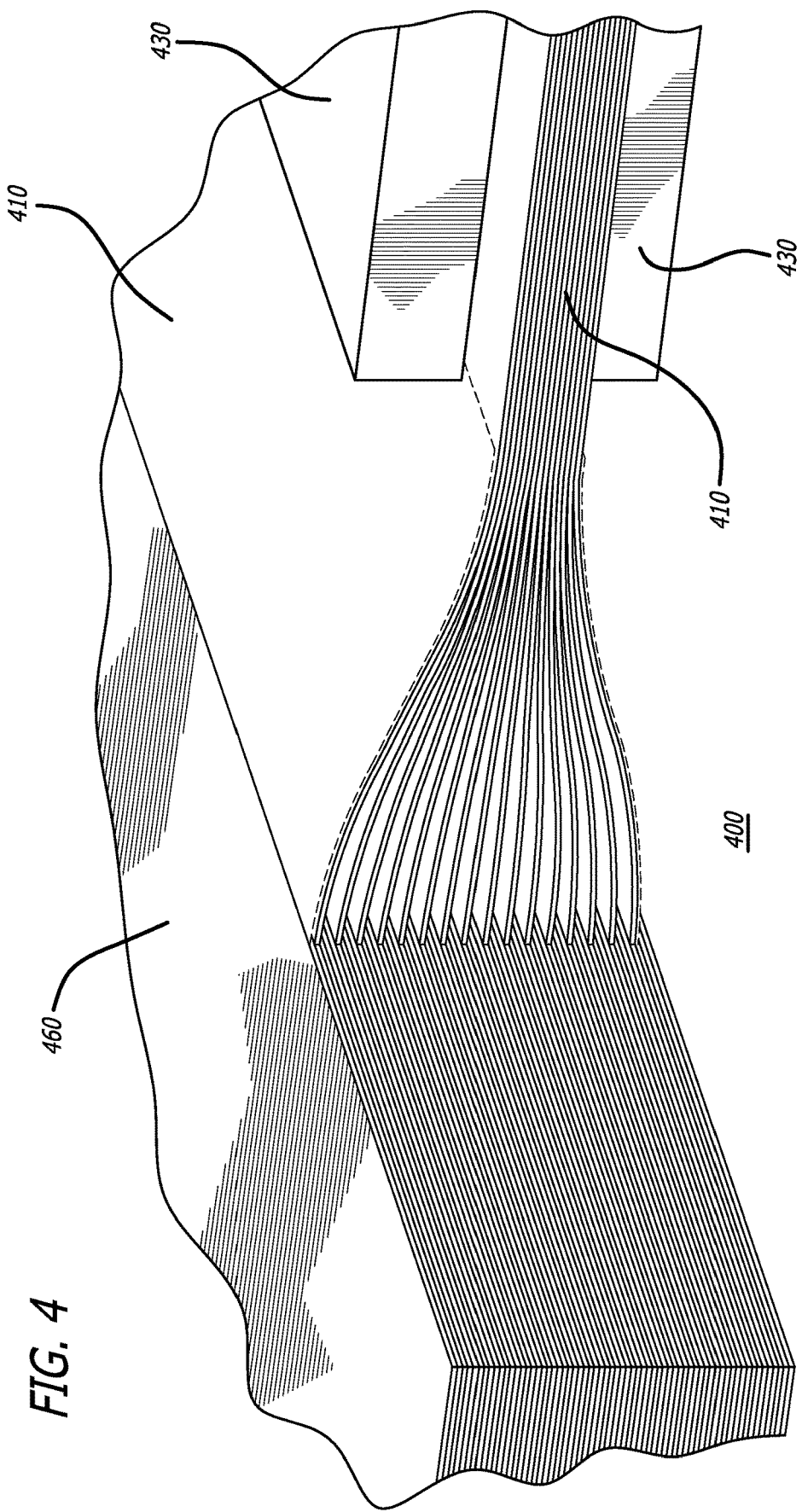
FIG. 4 is a diagram showing a detailed portion of a full perimeter electrode battery illustrating a plurality of anode electrodes of the battery, in accordance with at least one embodiment of the present disclosure.

FIG. 4 is a diagram showing a detailed portion of a full perimeter electrode battery 400 illustrating a plurality of anode electrodes (i.e. anode electrode tabs) 410 of the battery 400 (e.g., a detailed portion of a corner of battery 100 of FIG. 1A), in accordance with at least one embodiment of the present disclosure. In this figure, the anode electrodes 410 of sixteen battery cells of the battery 400 are shown to be extending external to the body 460 of the battery 400. The anode electrodes 410 are shown to be collected by an anode collector tab 430. In one or more embodiments, the anode collector tab 430 may be manufactured from an electrical conductor material (e.g., a metal, such as aluminum or copper). The anode collector tab 430 provides a sturdy connection port for the connection of the anode electrodes 410.

Figure 5:
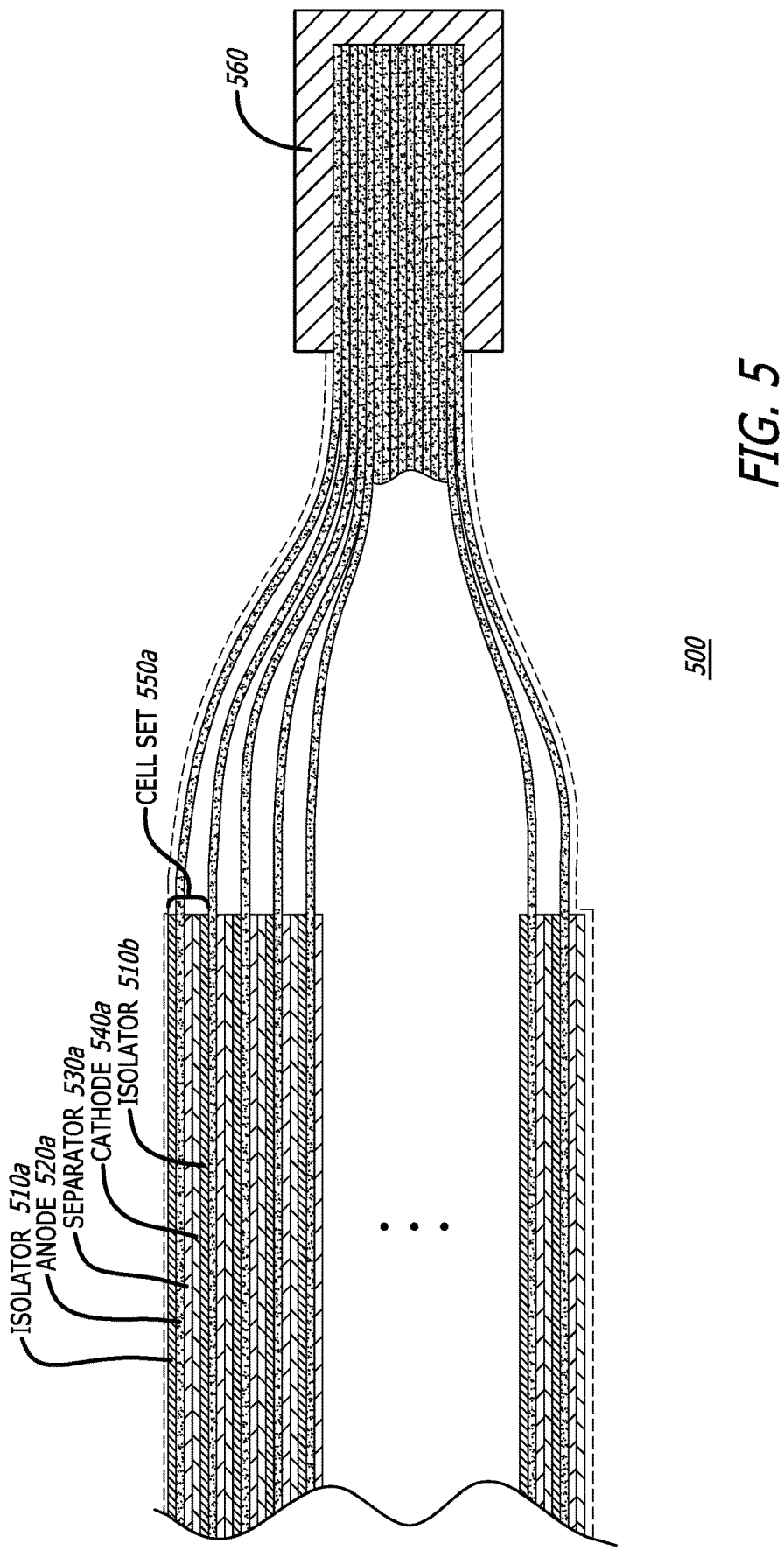
FIG. 5 is a diagram showing a cut-away view of a portion of a full perimeter electrode battery illustrating the layers of the battery, in accordance with at least one embodiment of the present disclosure.

FIG. 5 is a diagram showing a cut-away view of a portion of a full perimeter electrode battery 500 illustrating the layers of the battery 500, in accordance with at least one embodiment of the present disclosure. In this figure, a plurality of battery cells (e.g., battery cell 550a) are shown, with each battery cell 550a comprising a plurality of layers. In particular, battery cell (i.e. cell set) 550a is shown to comprise an isolator layer 510a, an anode layer 520a, a separator layer 530a, and a cathode layer 540a. In one or more embodiments, the battery cell 520a may comprise a secondary isolator layer 510b or, alternatively, isolator layer 510b may be part of a different battery cell. In some embodiments, each of the battery cells 550a are hermetically sealed (e.g., within a housing, such as a pouch surrounding the layers of the battery cell 550a) such that the battery cells 550a are electrically isolated from one another. In some embodiments, a housing employed for the sealing of the battery cells 550a may be manufactured from an electrical insulator material (e.g., a non-porous plastic, such as a polyethylene or a polypropylene).

Also shown in this figure, is an anode collector tab 560, which collects the anode electrodes, which extend out from the anode layers 520a of the battery 500. The anode collector tab 560 may be manufactured from a rigid conductive material (e.g., a metal), which provides for a robust connection port for the battery 500.

Figure 6:
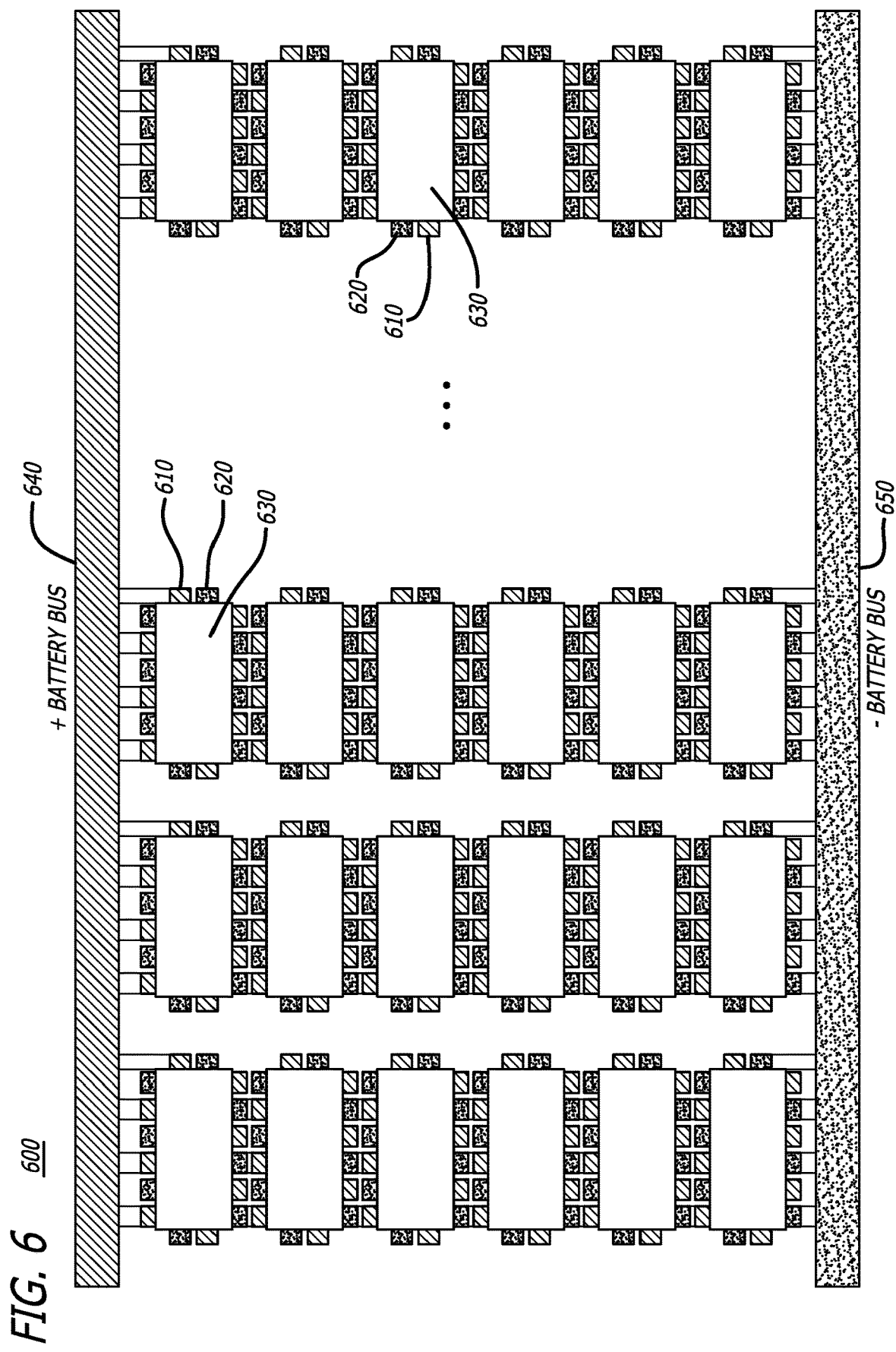
FIG. 6 is a diagram showing an exemplary battery configuration comprising a plurality of full perimeter electrode batteries connected to each other, in accordance with at least one embodiment of the present disclosure.

FIG. 6 is a diagram showing an exemplary battery configuration 600 comprising a plurality of full perimeter electrode batteries 630 connected to each other, in accordance with at least one embodiment of the present disclosure. In this battery configuration 600, batteries 630 are shown to be connected in columns in series together. The columns of the connected batteries 630 are shown to be connected to a positive (+) battery bus 640 and a negative (-) battery bus 650. In particular, the anode electrodes 620 of the batteries 630 are connected to cathode electrodes 610 of adjacent batteries 630 in the same column, and the anode electrodes 620 of the batteries 630 located adjacent to the negative (-) battery bus 650 are connected to the negative (-) battery bus 650. Similarly, the cathode electrodes 610 of the batteries 630 are connected to anode electrodes 620 of adjacent batteries 630 in the same column, and the cathode electrodes 610 of the batteries 630 located adjacent to the positive (+) battery bus 640 are connected to the positive (+) battery bus 640. It should be noted that the battery configuration 600 shown in FIG. 6 is only one example configuration for the connection of a plurality of batteries 630 and, as such, in other embodiments, other configurations for the connecting of a plurality of batteries 630 may be employed.

Figure 7:
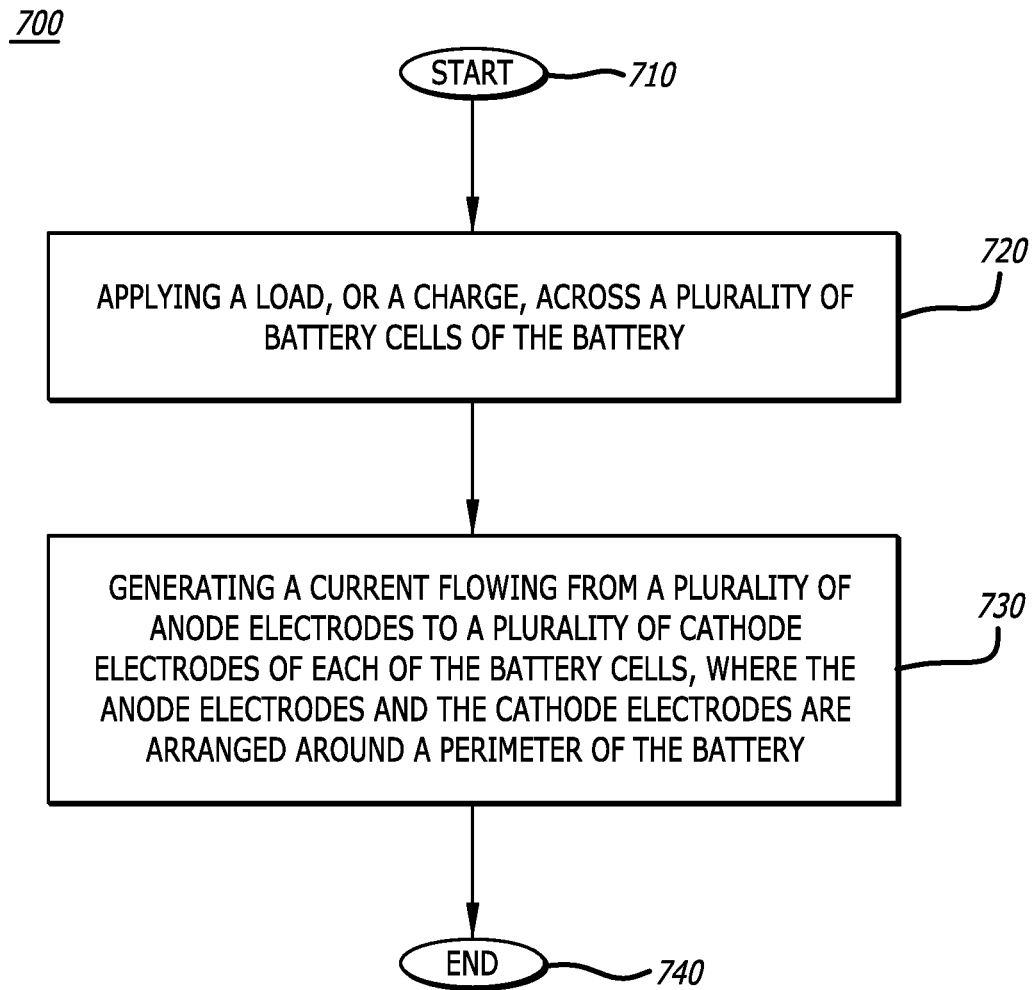
FIG. 7 is a flow chart showing the disclosed method for operation of a full perimeter electrode battery, in accordance with at least one embodiment of the present disclosure.

FIG. 7 is a flow chart showing the disclosed method 700 for operation of a full perimeter electrode battery, in accordance with at least one embodiment of the present disclosure. At the start 710 of the method 700, a load, or a charge is applied across a plurality of battery cells of the battery 720. Then, a current is generated that flows from a plurality of anode electrodes to a plurality of cathode electrodes of each of the battery cells, where the anode electrodes and the cathode electrodes are arranged around a perimeter of the battery 730. Then, the method 700 ends 740.

Figure 8:
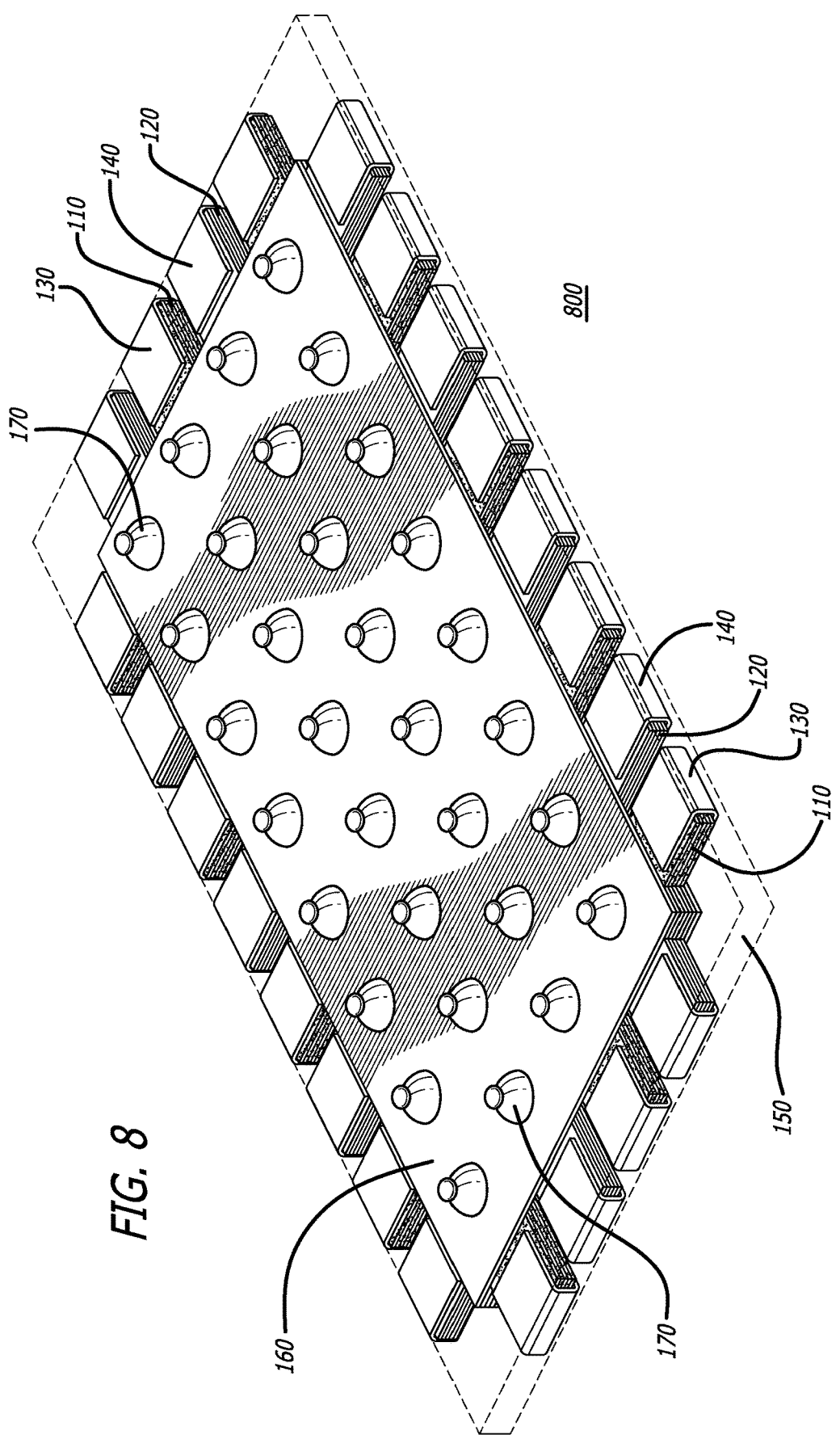
FIG. 8 is a diagram showing a full perimeter electrode battery, which comprises a plurality of conductive cross ties, in accordance with at least one embodiment of the present disclosure.

FIG. 8 is a diagram showing a full perimeter electrode battery 800, which comprises a plurality of conductive cross ties 170, in accordance with at least one embodiment of the present disclosure. In one or more embodiments, the full perimeter electrode battery 800 (e.g., also refer to battery 100 of FIG. 1A) may additionally comprise a plurality of conductive cross ties 170 (e.g., which may comprise anode cross ties and/or cathode cross ties), as is shown in FIG. 8. In one or more embodiments, the conductive cross ties 170 may be manufactured from an electrical conductor material, such as a metal (e.g., aluminum or copper). The cross ties 170 incorporated within the battery 800 can provide both electrical and structural interconnections to accommodate both electrical and structural types of loads. The cross ties 170 can also help control shear, tension, and compression loads to the battery 800 as well as act as distributed electrical connections. Incorporating cross ties 170 within the battery 800 allows for the stacking of the batteries 800 together (e.g., refer to FIG. 11) as well as for structural members (e.g., refer to FIG. 12) where the cross ties 170 can carry the loading.

It should be noted that, in FIG. 8 only the top conductive protrusion of the cross ties 170 is visible, and that the cross ties 170 actually comprise a barbell shape (e.g., refer to FIG. 10). In FIG. 8, the top conductive protrusion (which is external to the body 160 of the battery 800) of the cross ties 170 is shown to comprise a connecting portion, which is in the form of a rivet ball. In some embodiments, the connecting portion may be of other different types of shapes than a rivet ball as is depicted in FIG. 8. And, in other embodiments, the top conductive protrusion of the cross ties 170 may not comprise this additional connecting portion at all. In addition, it should be noted that, in one or more embodiments, the battery 800 may comprise a greater number or lower number of cross ties than as specifically illustrated in FIG. 8.

Figure 9A:
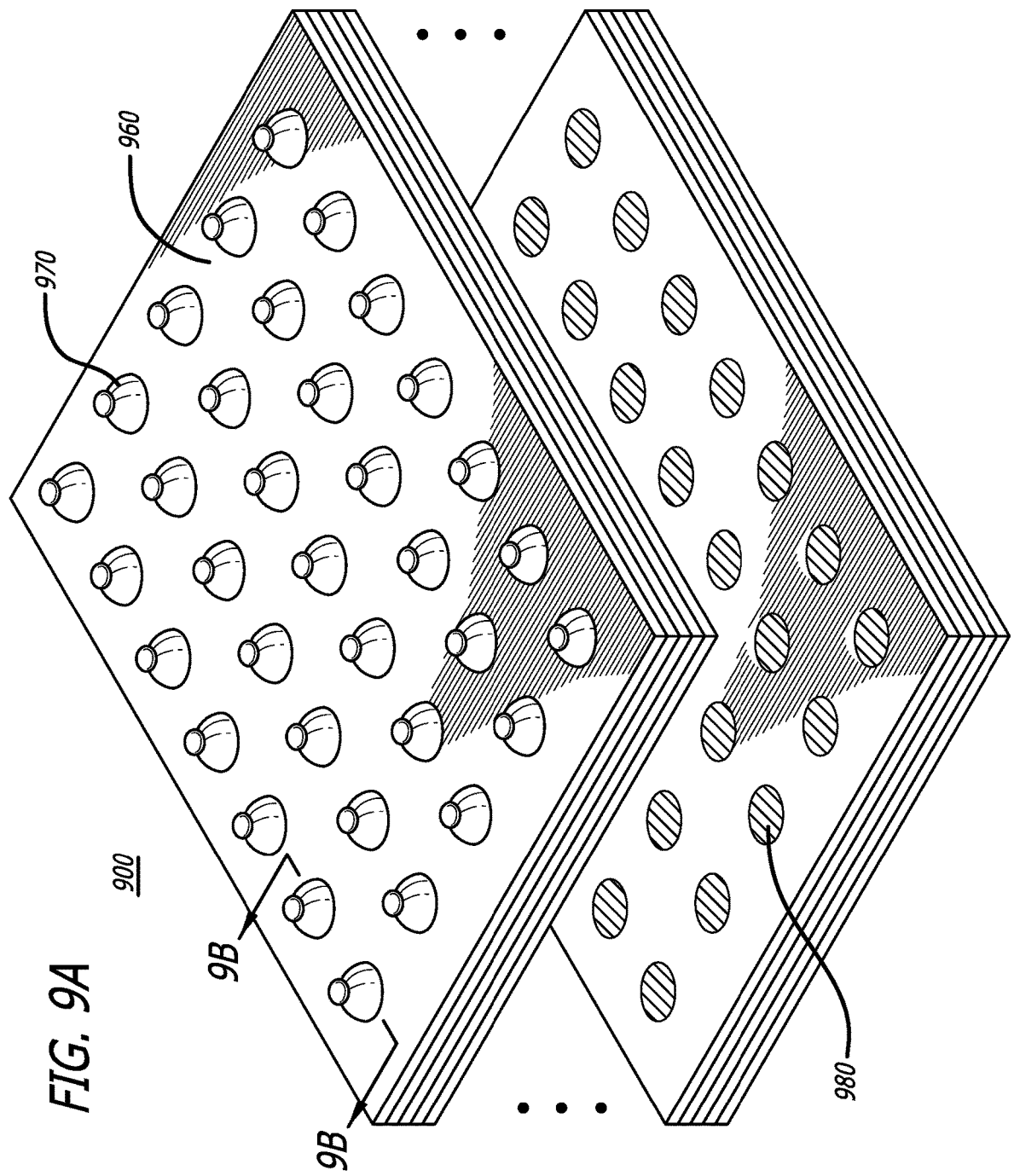
FIG. 9A is a diagram showing a cut-away view of a portion of a full perimeter electrode battery, which comprises a plurality of conductive cross ties, in accordance with at least one embodiment of the present disclosure.

FIG. 9A is a diagram showing a cut-away view of a portion 900 of a full perimeter electrode battery, which comprises a plurality of conductive cross ties, in accordance with at least one embodiment of the present disclosure. In this figure, the top conductive protrusion 970, which is external to the body 960 of the battery, of the cross ties is shown. Also shown is the bar portion 980 of the cross ties. The bar portion 980 of the cross ties spans the entirety of the battery cell (i.e. the bar portion 980 the cross ties runs through all of layers of the battery).

Figure 9B:
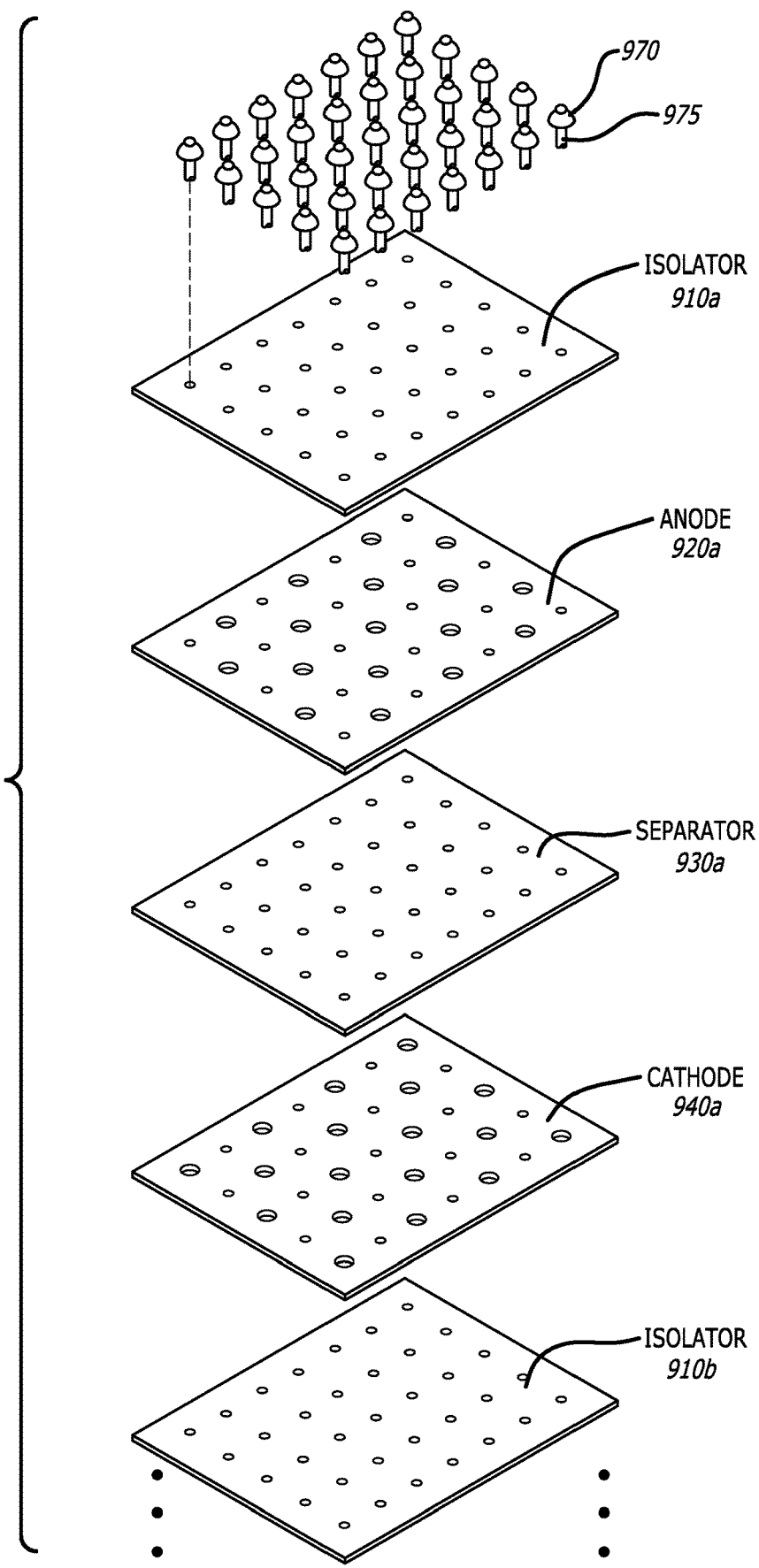
FIG. 9B is a diagram showing an exploded view of a portion of a full perimeter electrode battery, which comprises a plurality of conductive cross ties, illustrating the layers of the battery, in accordance with at least one embodiment of the present disclosure.

FIG. 9B is a diagram showing an exploded view of a portion of a full perimeter electrode battery, which comprises a plurality of conductive cross ties, illustrating the layers of the battery, in accordance with at least one embodiment of the present disclosure. In this figure, the cross ties are each shown to comprise a top conductive protrusion 970 and a bar portion 975. It should be noted that the bottom conductive protrusion of the cross ties is not shown in FIG. 9B. Also shown in this figure are a plurality of battery layers, which include an isolator layer 910a, an anode layer 920a, a separator layer 930a, a cathode layer 940a, and another isolator layer 910b.

FIG. 10 is a diagram showing a cut-away view of a portion of a full perimeter electrode battery 1000, which comprises an anode cross tie and a cathode cross tie, illustrating the layers of the battery, in accordance with at least one embodiment of the present disclosure. In this figure, the anode cross tie is shown to comprise a top conductive protrusion 1070a (which comprises a connecting portion 1080a in the form of a rivet ball), a bar portion 1075a, and a bottom conductive protrusion 1090a. And, similarly, the cathode cross tie is shown to comprise a top conductive protrusion 1070b (which comprises a connecting portion 1080b in the form of a rivet ball), a bar portion 1075b, and a bottom conductive protrusion 1090b.

Also, in this figure, the battery 1000 is shown to comprise a plurality of battery cells, which each comprise a plurality of layers. In particular, the battery 1000 in FIG. 10 is shown to comprise a first battery cell (which comprises an isolator layer 1010a, an anode layer 1020a, a separator layer 1030a, a cathode layer 1040a, and a secondary isolator layer 1050a), a second battery cell (which comprises an isolator layer 1010b, an anode layer 1020b, a separator layer 1030b, a cathode layer 1040b, and a secondary isolator layer 1050b), and a third battery cell (which comprises an isolator layer 1010c, an anode layer 1020c, a separator layer 1030c, a cathode layer 1040c, and a secondary isolator layer 1050c).

In FIG. 10, the anode cross tie and cathode cross tie are shown to run through all of the layers of the battery 1000. However, it should be noted that the anode cross tie is electrically connected to all of the layers of the battery 1000 except for the cathode layers 1040a, 1040b, 1040c, and the cathode cross tie is electrically connected to all of the layers of the battery 1000 except for the anode layers 1020a, 1020b, 1020c.

It should be noted that although in FIG. 10 the anode cross tie is electrically connected to all of the anode layers 1020a, 1020b, 1020c of the battery 1000, in other embodiments, the anode cross tie may only be electrically connected to some of the anode layers 1020a, 1020b, 1020c of the battery 1000. Similarly, although in FIG. 10 the cathode cross tie is electrically connected to all of the cathode layers 1040a, 1040b, 1040c of the battery 1000, in other embodiments, the cathode cross tie may only be electrically connected to some of the cathode layers 1040a, 1040b, 1040c of the battery 1000.

During operation of the battery 1000 of FIG. 10, a load (for the discharging of the battery 1000), or alternatively a charge (for the charging of the battery 1000), is applied across battery 1000 (e.g., is applied across the anode cross tie and the cathode cross tie). Then, a current is generated that flows through the anode cross tie, and a current is generated that flows through the cathode cross tie.

Figure 11:
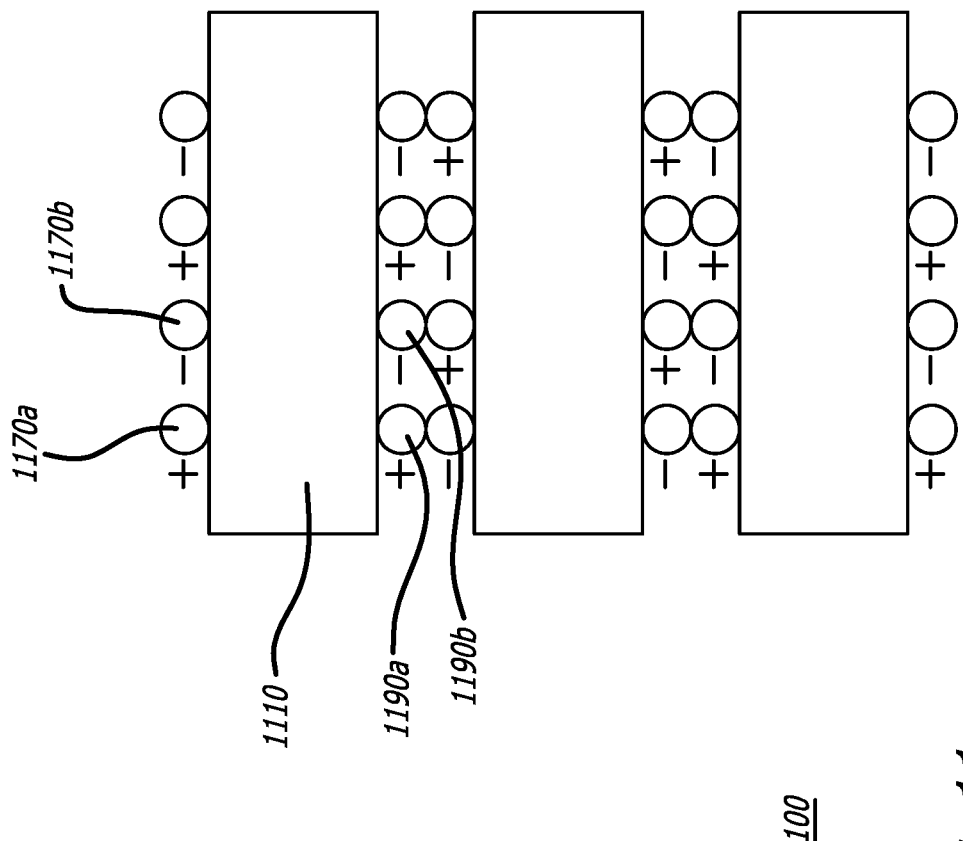
FIG. 11 is a diagram showing an exemplary battery configuration comprising a plurality of full perimeter electrode batteries, which each comprise a plurality of conductive cross ties, stacked together, in accordance with at least one embodiment of the present disclosure.

FIG. 11 is a diagram showing an exemplary battery configuration 1100 comprising a plurality of full perimeter electrode batteries 1110, which each comprise a plurality of conductive cross ties, stacked together, in accordance with at least one embodiment of the present disclosure. In this battery configuration 1100, the batteries 1110 are shown to be stacked on top of each other. In particular, for this configuration 1100, the top conductive protrusions 1170a of the anode cross ties of batteries 1110 are electrically connected to bottom conductive protrusions 1190b of cathode cross ties of adjacent batteries 1110, and the top conductive protrusions 1170b of the cathode cross ties of batteries 1110 are electrically connected to bottom conductive protrusions 1190a of anode cross ties of adjacent batteries 1110.

Figure 12:
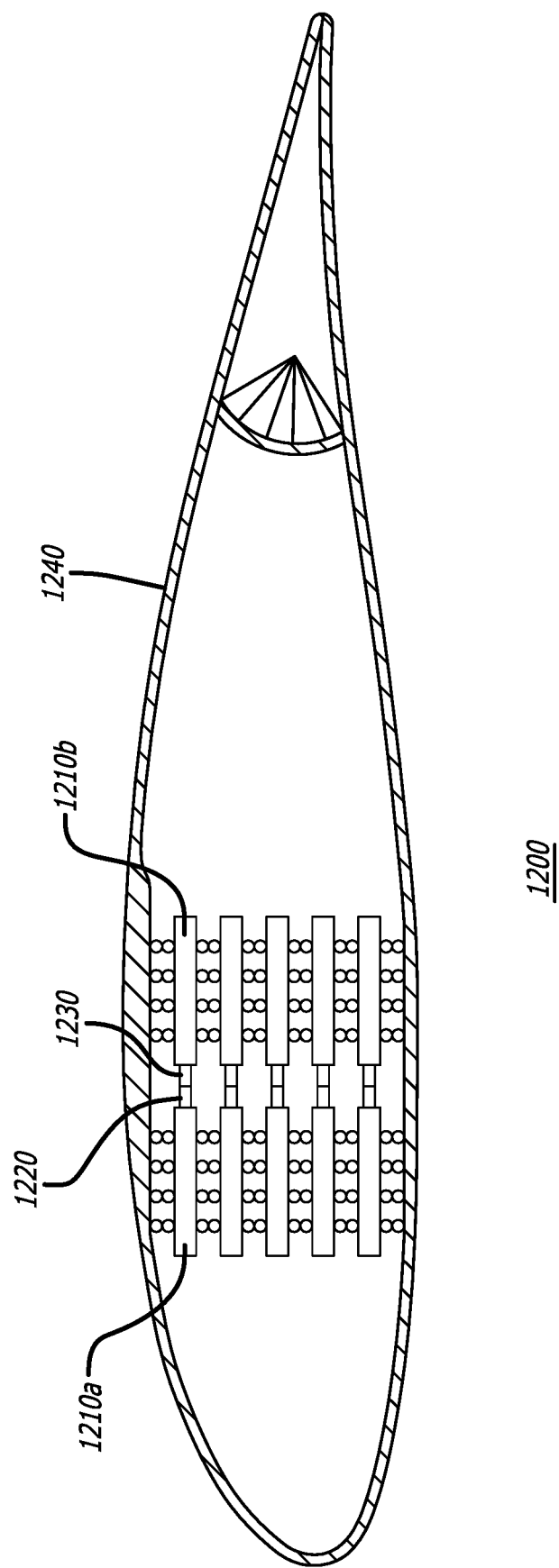
FIG. 12 is a diagram showing an exemplary battery configuration comprising a plurality of full perimeter electrode batteries, which each comprise a plurality of conductive cross ties, packed together within a finned spar of an aircraft, in accordance with at least one embodiment of the present disclosure.

FIG. 12 is a diagram showing an exemplary battery configuration comprising a plurality of full perimeter electrode batteries 1210a, 1210b, which each comprise a plurality of conductive cross ties, packed together within a finned spar 1240 of an aircraft, in accordance with at least one embodiment of the present disclosure. As previously mentioned above, cross ties integrated within a battery can provide a conductive as well as structural connection for the battery into a structure, such as a vehicle (e.g., an aerospace vehicle). The integration of the battery within an aerospace structure can allow for a reduction in the overall weight of the aircraft. The cross ties can connect to the structure to provide both electrical and structural interconnections to the structure.

In this figure, the batteries 1210a, 1210b are shown to stacked on top of each other within the finned spar 1240 of an aircraft. In particular, as is shown, the top and bottom conductive protrusions of the anode cross ties of the batteries 1210a, 1210b are electrically connected with the top and bottom conductive protrusions of the cathode cross ties of the adjacent batteries 1210a, 1210b. In addition, the top and bottom conductive protrusions of the anode cross ties and the cathode cross ties of the batteries 1210a, 1210b are electrically and structurally connected to the structure (i.e. connected to the interior of the finned spar 1240). Also shown in FIG. 12, the anode electrodes 1220 of the batteries 1210a, 1210b, are electrically connected to the cathode electrodes 1230 of the adjacent batteries 1210a, 1210b (e.g., the anode electrode 1220 of battery 1210a is electrically connected to the cathode electrode 1230 of battery 1210b).

It should be noted that the battery configuration shown in FIG. 12 is only one example configuration for the packing of the batteries 1210a, 1210b within a structure and, as such, in other embodiments, other configurations for packing of the batteries 1210a, 1210b within a structure may be employed.

Figure 13:
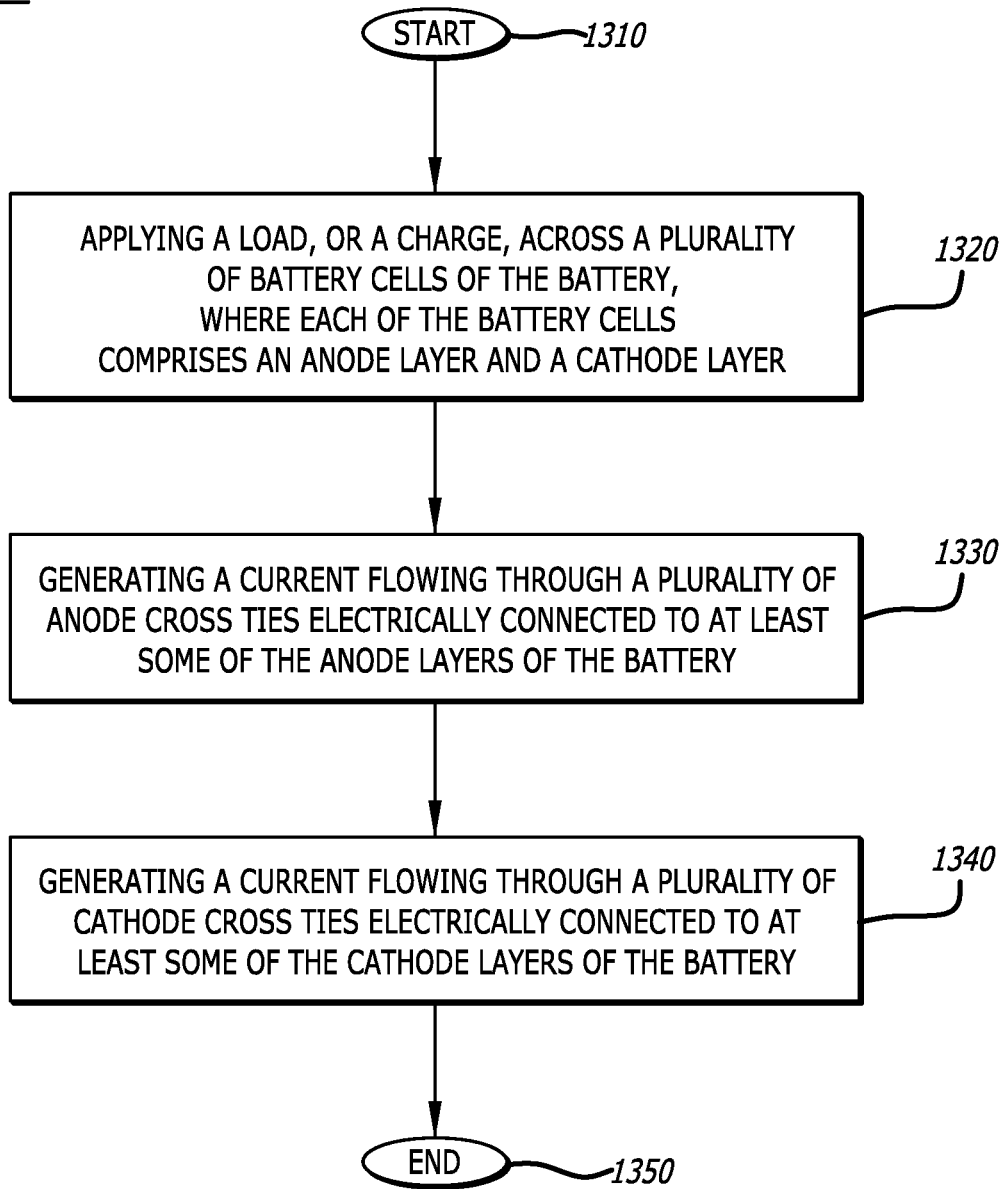
FIG. 13 is a flow chart showing the disclosed method for operation of a full perimeter electrode battery, which comprises conductive cross ties, in accordance with at least one embodiment of the present disclosure.

FIG. 13 is a flow chart showing the disclosed method 1300 for operation of a full perimeter electrode battery, which comprises conductive cross ties, in accordance with at least one embodiment of the present disclosure. At the start 1310 of the method 1300, a load, or a charge, is applied across a plurality of battery cells of the battery, where each of the battery cells comprises an anode layer and a cathode layer 1320. Then, a current is generated that flows through a plurality of anode cross ties that are electrically connected to at least some of the anode layers of the battery 1330. Also, a current is generated that flows through a plurality of cathode cross ties that are electrically connected to at least some of the cathode layers of the battery 1340. Then, the method 1310 ends 1350.

Figure 14:
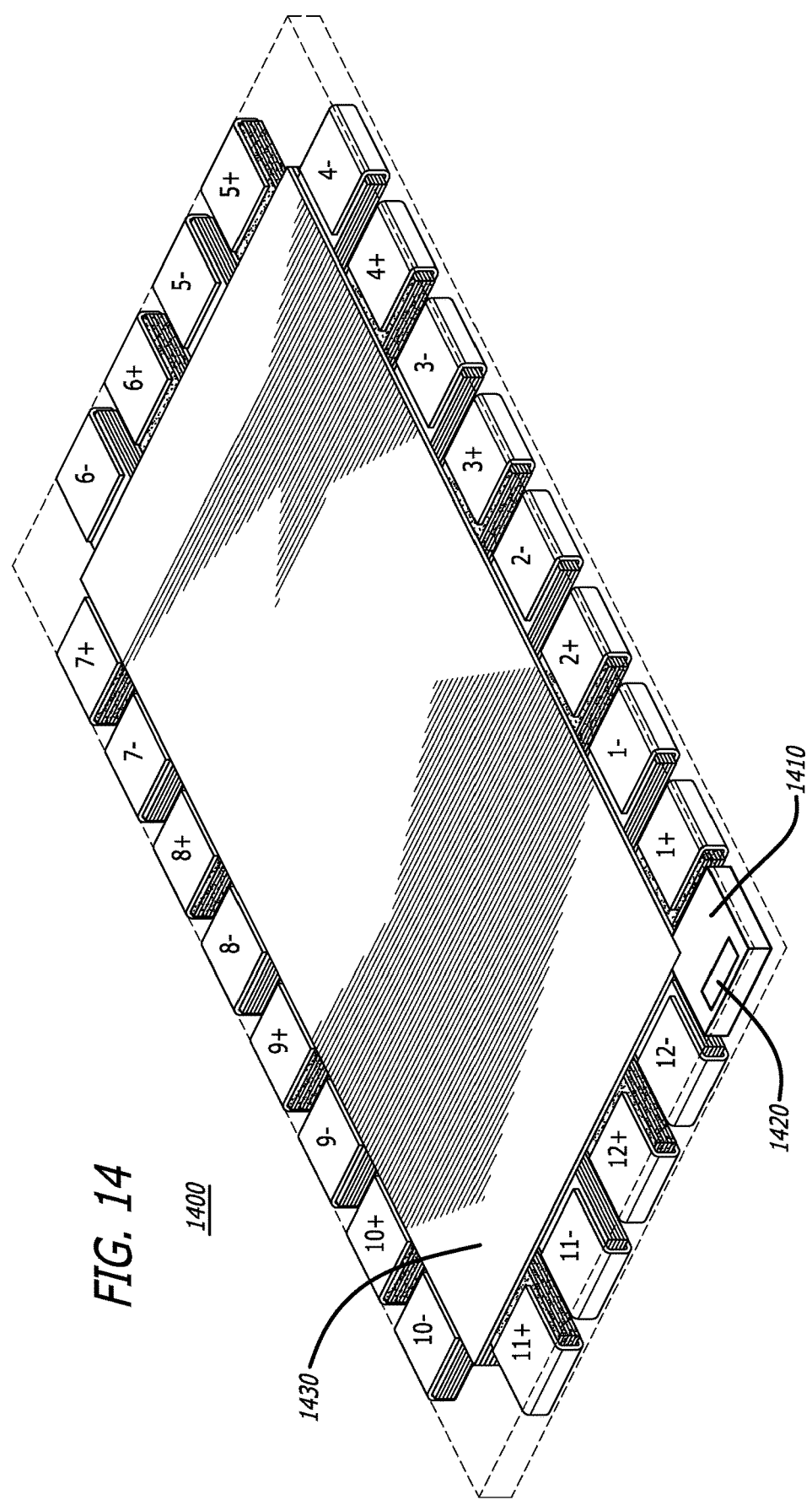
FIG. 14 is a diagram showing a full perimeter electrode battery, which comprises a controller for controlling selective switching of the electrodes, in accordance with at least one embodiment of the present disclosure.

FIG. 14 is a diagram showing a full perimeter electrode battery 1400, which comprises a controller 1410 for controlling selective switching of the electrodes, in accordance with at least one embodiment of the present disclosure. As previously mentioned above, selective switching of the electrodes of the battery during the charging and discharging of the battery 1400 allows for the motion of the electrolyte species and contaminants within the battery 1400 to be controlled and managed to assure maximum cell performance. In one or more embodiments, switched charging controls and logic-based use of the switching of the electrodes are employed to distribute the charge uniformly across the battery 1400.

In this figure, the anode electrodes of the battery 1400 are labeled from +1 to +12, and the cathode electrodes of the battery 1400 are labeled from −1 to −12. During operation of the battery 1400, a processor 1420 determines a pattern for applying a load (for the discharging of the battery 1400) or a charge (for the charging of the battery 1400) from the anode electrodes +1 to +12 to the cathode electrodes −1 to −12 such that charge is uniformly distributed across the body 1430 of each of the battery cells of the battery 1400. In one or more embodiments, the processor may utilize previously acquired charge data of the battery 1400 (e.g., from laboratory testing of the battery 1400) to determine the pattern. Then, the controller 1410 applies the load or the charge from the anode electrodes +1 to +12 to the cathode electrodes −1 to −12 according to the pattern determined by the processor.

In this figure, the controller 1410 is shown to be located external to the body 1430 of the battery 1400. In particular, the controller 1410 is shown to be located on a corner of the battery 1400 between anode electrode +1 and cathode electrode −12. In other embodiments, the controller 1410 may be located in other locations external to the body 1430 of the battery 1400. And, in alternative embodiments, the controller 1410 may be housed within the body 1430 of the battery 1400. In addition, the controller 1410 is shown to comprise the processor 1420. In other embodiments, the processor 1420 may be located separate from the controller 1410.

Figure 15:
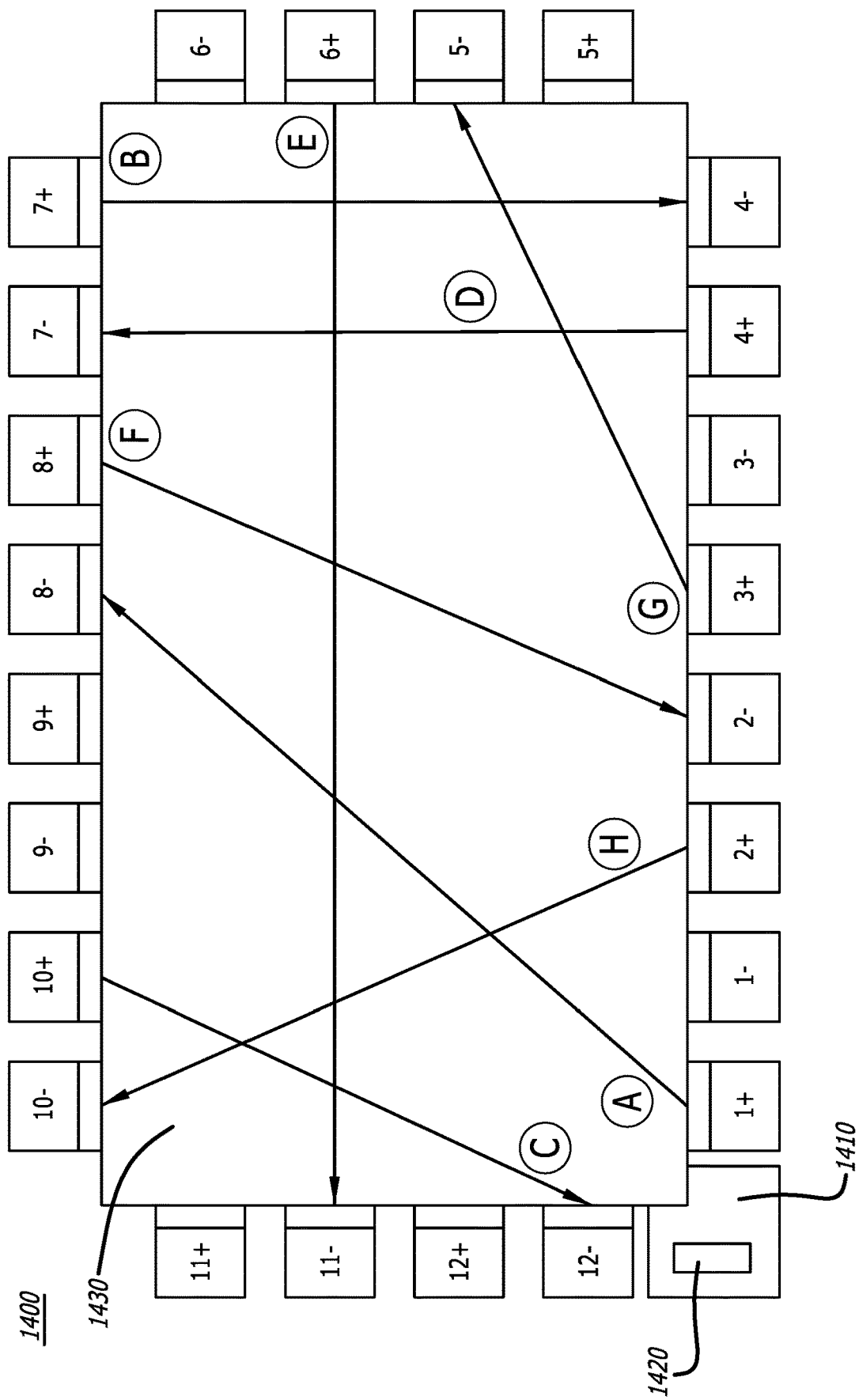
FIG. 15 is a schematic diagram illustrating the selective switching of the electrodes of a full perimeter electrode battery, in accordance with at least one embodiment of the present disclosure.

FIG. 15 is a schematic diagram illustrating the selective switching of the electrodes of a full perimeter electrode battery 1400, in accordance with at least one embodiment of the present disclosure. In particular, this figure illustrates an exemplary algorithm (or pattern) of selectively switching the electrodes to apply a load or a charge from the anode electrodes +1 to +12 to the cathode electrodes −1 to −12 such that charge is uniformly distributed across the body 1430 of each of the battery cells of the battery 1400. It should be noted that the algorithm illustrated in FIG. 15 is only one example algorithm that may be employed for the selective switching of the electrodes of the battery 1400 and that, in other embodiments, other similar algorithms, which allow for a uniform distribution of charge across the battery 1400, may be employed.

Specifically, in this figure, the algorithm (or pattern) begins by applying a load, or charge, from anode +1 to cathode −8 (refer to step A). Then, a load, or charge, is applied from anode +7 to cathode −4 (refer to step B). A load, or charge, is then applied from anode +10 to cathode −12 (refer to step C). Then, a load, or charge, is applied from anode +4 to cathode −7 (refer to step D). A load, or charge, is then applied from anode +6 to cathode −11 (refer to step E). Then, a load, or charge, is applied from anode +8 to cathode −2 (refer to step F). A load, or charge, is then applied from anode +3 to cathode −5 (refer to step G). Lastly, a load, or charge, is applied from anode +2 to cathode −10 (refer to step H). The operation of applying a load, or a charge, across the electrodes according to the determined switching pattern ensures that charge is uniformly distributed across the body 1430 of the battery 1400, thereby allowing for the performance and life of the battery 1400 to be maximized.

Figure 16:
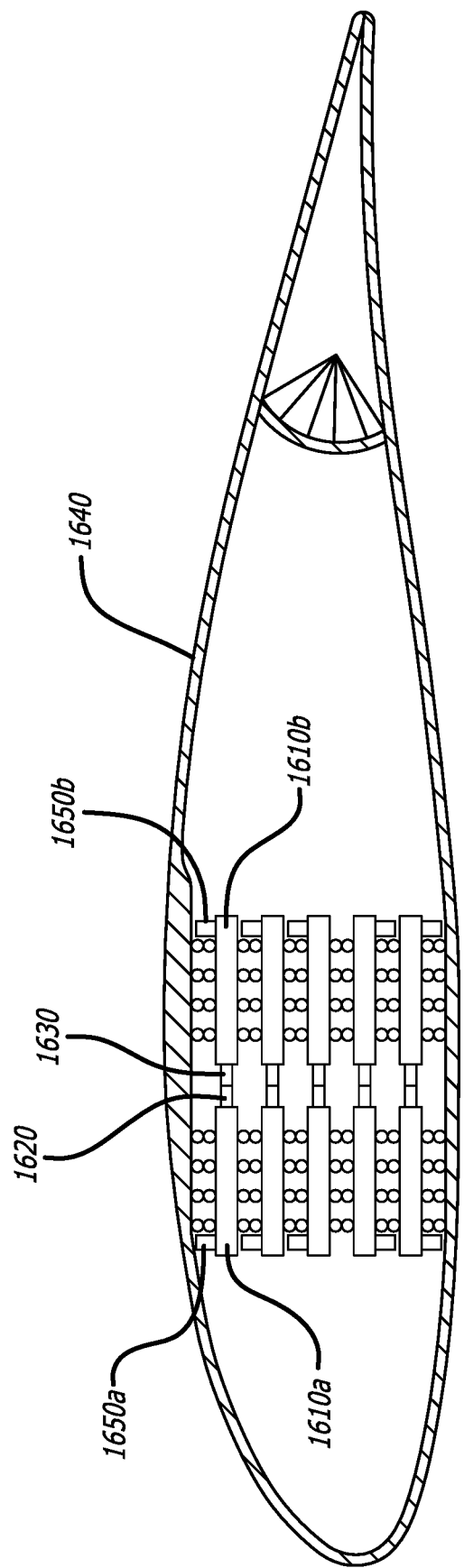
FIG. 16 is a diagram showing an exemplary battery configuration comprising a plurality of full perimeter electrode batteries, which each comprise a controller and a plurality of conductive cross ties, packed together within a finned spar of an aircraft, in accordance with at least one embodiment of the present disclosure.

FIG. 16 is a diagram showing an exemplary battery configuration comprising a plurality of full perimeter electrode batteries 1610a, 1610b, which each comprise a controller 1650a, 1650b and a plurality of conductive cross ties, packed together within a finned spar 1640 of an aircraft, in accordance with at least one embodiment of the present disclosure. In particular, this figure shows how the controllers 1650a, 1650b of the batteries 1610a, 1610b may be structurally integrated within a structure, such as a finned spar 1640 of an aircraft.

Also shown in this figure, the batteries 1610a, 1610b are stacked on top of each other within the finned spar 1640. The top and bottom conductive protrusions of the anode cross ties of the batteries 1610a, 1610b are electrically connected with the top and bottom conductive protrusions of the cathode cross ties of the adjacent batteries 1610a, 1610b. In addition, the top and bottom conductive protrusions of the anode cross ties and the cathode cross ties of the batteries 1610a, 1610b are electrically and structurally connected to the structure (i.e. connected to the interior of the finned spar 1640). Also shown in FIG. 16, the anode electrodes 1620 of the batteries 1610a, 1610b, are electrically connected to the cathode electrodes 1630 of the adjacent batteries 1610a, 1610b (e.g., the anode electrode 1620 of battery 1610a is electrically connected to the cathode electrode 1630 of battery 1610b).

The battery configuration shown in FIG. 16 is only one example configuration for the packing of the batteries 1610a, 1610b and controllers 1650a, 1650b within a structure. It should be noted that in other embodiments, other configurations for packing of the batteries 1610a, 1610b and controllers 1650a, 1650b within a structure may be employed.

Figure 17:
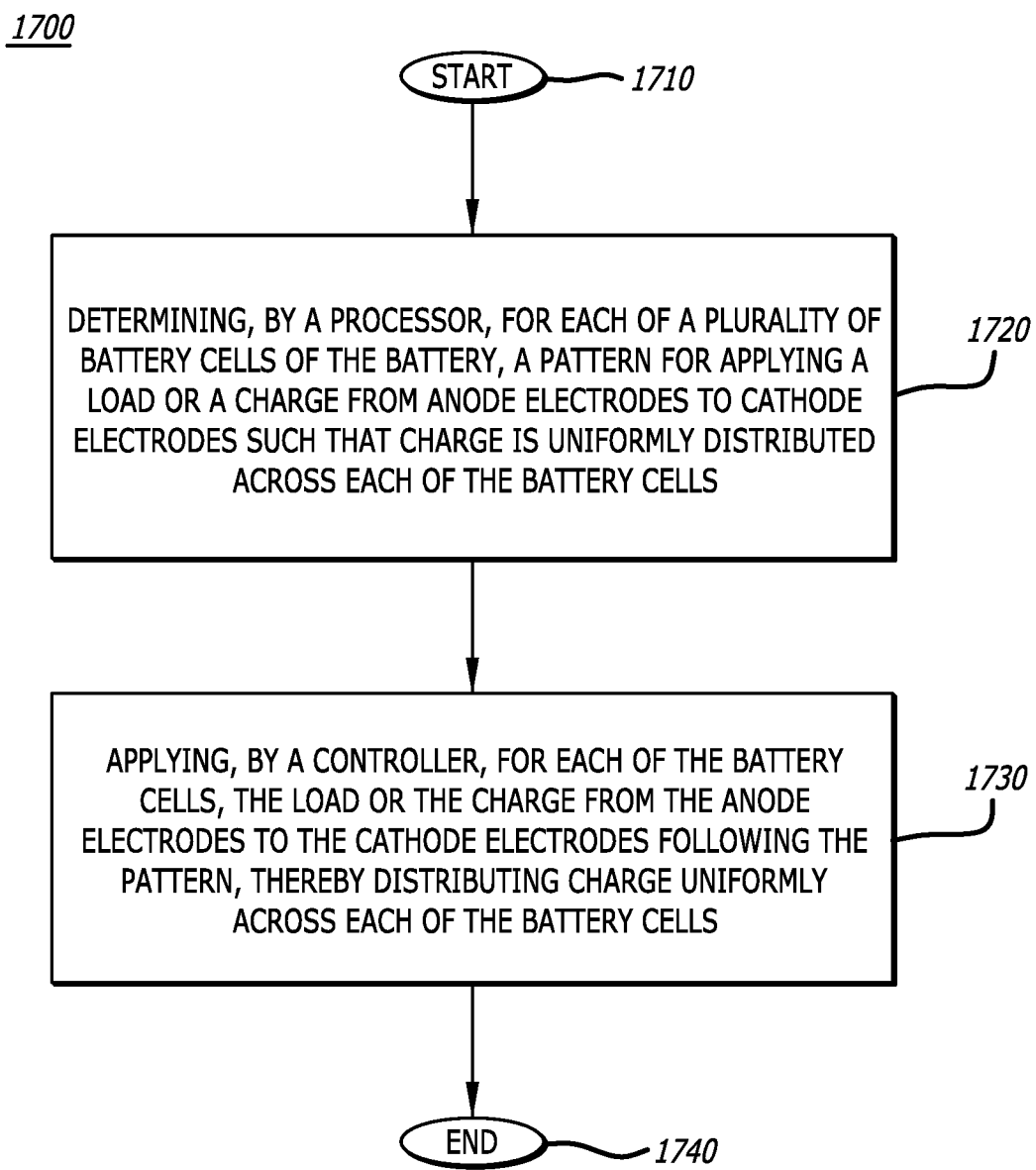
FIG. 17 is a flow chart showing the disclosed method for selective switching of the electrodes of a full perimeter electrode battery, in accordance with at least one embodiment of the present disclosure.

FIG. 17 is a flow chart showing the disclosed method 1700 for selective switching of the electrodes of a full perimeter electrode battery, in accordance with at least one embodiment of the present disclosure. At the start 1710 of the method 1700, a processor determines, for each of a plurality of battery cells of the battery, a pattern for applying a load, or a charge, from anode electrodes to cathode electrodes such that charge is uniformly distributed across each of the battery cells 1720. Then, a controller applies, for each of the battery cells, the load or the charge from the anode electrodes to the cathode electrodes following the pattern, thereby distributing charge uniformly across each of the battery cells 1730. Then, the method 1700 ends 1740.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A battery, the battery comprising:
   a housing;
   a body within the housing, the body comprising a plurality of battery cells each of which comprises an anode electrode and a cathode electrode; and
   a plurality of anode connection ports and a plurality of cathode connection ports, wherein each of the anode and cathode connection ports is physically accessible from outside of the housing for being physically contacted by an external circuit, the anode and cathode connection ports being arranged around a perimeter of the battery, each of the plurality of anode connection ports providing a connection to each of said anode electrodes, each of the plurality of cathode connection ports providing a connection to each of said cathode electrodes.

2. The battery of claim 1, wherein the plurality of the anode connection ports and the plurality of the cathode connection ports are arranged such that the anode and cathode connection ports are alternating around the perimeter of the battery.

3. The battery of claim 1, wherein there are an equal number of the plurality of the anode connection ports and the plurality of the cathode connection ports.

4. The battery of claim 1, wherein each of the plurality of the battery cells comprises a plurality of layers.

5. The battery of claim 4, wherein:
   the plurality of the layers, of each of the plurality of the battery cells, comprise an isolator layer, an anode layer, a separator layer, and a cathode layer;
   each anode layer comprises a corresponding one of the anode electrodes and a plurality of extensions each of which extends to a corresponding one of the plurality of anode connection ports;
   each cathode layer comprises a corresponding one of the cathode electrodes and a plurality of extensions each of which extends to a corresponding one of the plurality of cathode connection ports.

6. The battery of claim 5, wherein the isolator layer comprises an electrical insulator material.

7. The battery of claim 5, wherein the separator layer comprises an electrolyte material.

8. The battery of claim 5, wherein the anode layer and the cathode layer both comprise an electrical conductor material.

9. The battery of claim 1, wherein the battery is one of a pouch battery or a prismatic battery.

10. The battery of claim 1, wherein each of the plurality of the anode connection ports of the battery is in electrical connection with cathode electrodes of a second battery, and each of the plurality of the cathode connection ports of the battery is in electrical connection with anode electrodes of the second battery.

11. The battery of claim 1, wherein the body is hermetically sealed within the housing.

12. The battery of claim 1, wherein each of the plurality of the battery cells is hermetically sealed such that each of the plurality of the battery cells are electrically isolated from one another.

13. The battery of claim 5, wherein each of the anode connection ports comprises an anode electrode collector tab collecting corresponding ones of the plurality of extensions of each of the plurality of the anode electrodes.

14. The battery of claim 5, wherein each of the cathode connection ports comprises a cathode electrode collector tab collecting corresponding ones of the plurality of extensions of each of the plurality of the cathode electrodes.

15. The battery of claim 1, wherein the battery is housed within a portion of a vehicle.

16. The battery of claim 1, wherein the battery forms a structural component of a vehicle.

17. A method of operating the battery of claim 1, the method comprising:
   applying a load or a charge across the plurality of battery cells of the battery; and
   generating a current flowing from the plurality of anode electrodes to the plurality of cathode electrodes of each of the plurality of the battery cells.

18. The method of claim 17, wherein the anode and cathode connection ports are arranged such that they are alternating around the perimeter of the battery.

19. The method of claim 17, wherein there are an equal number of the plurality of the anode connection ports and the plurality of the cathode connection ports.

20. The method of claim 17, wherein each of the plurality of the battery cells comprises a plurality of layers.

21. The battery of claim 1, wherein the housing electrically isolates the body from external electrical components.

22. The battery of claim 1, wherein applying a load or a charge through different ones of the anode connection ports and different ones of the cathode connection ports improves charge distribution uniformity across the battery cells.

23. The battery of claim 1, wherein the body is rectangular, and the connection ports are provided on all four sides of the body.

* * * * *

UNITED STATES PATENT AND TRADEMARK OFFICE
CERTIFICATE OF CORRECTION

PATENT NO. : 11,967,738 B2
APPLICATION NO. : 16/684442
DATED : April 23, 2024
INVENTOR(S) : Roger D. Bernhardt It is certified that error appears in the above-identified patent and that said Letters Patent is hereby corrected as shown below:

In the Specification

Column 10, Line 31, change "as well as for structural members" to --as well as for creating structural members--.

Signed and Sealed this
Twenty-eighth Day of May, 2024

Katherine Kelly Vidal
*Director of the United States Patent and Trademark Office*